United States Patent
Eguchi et al.

(10) Patent No.: US 7,285,051 B2
(45) Date of Patent: Oct. 23, 2007

(54) GAME INFORMATION STORAGE MEDIUM AND GAME SYSTEM USING THE SAME

(75) Inventors: Katsuya Eguchi, Kyoto (JP); Takashi Tezuka, Kyoto (JP); Shigeru Miyamoto, Kyoto (JP); Teruki Murakawa, Kyoto (JP); Sagahiro Taho, Kyoto (JP); Hideya Akasaka, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 700 days.

(21) Appl. No.: 10/408,662

(22) Filed: Apr. 8, 2003

(65) Prior Publication Data

US 2004/0005928 A1     Jan. 8, 2004

Related U.S. Application Data

(63) Continuation-in-part of application No. 10/217,140, filed on Aug. 13, 2002, now Pat. No. 6,951,516, and a continuation-in-part of application No. 09/774,660, filed on Feb. 1, 2001, now Pat. No. 6,955,606, and a continuation-in-part of application No. 09/774,661, filed on Feb. 1, 2001, now abandoned.

(60) Provisional application No. 60/313,470, filed on Aug. 21, 2001, provisional application No. 60/206,977, filed on May 25, 2000.

(51) Int. Cl.
*A63F 9/22*     (2006.01)
*A63F 13/00*     (2006.01)

(52) U.S. Cl. .................................................. 463/43

(58) Field of Classification Search ............ 463/43–47, 463/9, 30, 40; 273/148 B–148 R
See application file for complete search history.

(56) References Cited

U.S. PATENT DOCUMENTS

| | | | |
|---|---|---|---|
| 4,570,930 | A | 2/1986 | Matheson |
| 4,903,218 | A | 2/1990 | Longo et al. |
| 5,051,822 | A | 9/1991 | Rhoades |
| 5,083,800 | A | 1/1992 | Lockton |
| 5,149,104 | A | 9/1992 | Edelstein |
| 5,251,909 | A | 10/1993 | Reed et al. |
| 5,412,800 | A | 5/1995 | Bril et al. |
| 5,448,263 | A | 9/1995 | Martin |

(Continued)

OTHER PUBLICATIONS

Donkey Kong 64 FAQ Jan. 29, 2000 http://db.gamefaqs.com/console/n64/file/donkey_kong_64_c_do_not_link_directly_to_this_file_or_ any_others.txt.*

(Continued)

*Primary Examiner*—Robert E Pezzuto
(74) *Attorney, Agent, or Firm*—Nixon & Vanderhye P.C.

(57) ABSTRACT

A game system includes a first game machine which operates according to a first architecture and, a second game machine which operates according to a second architecture different from the first architecture and has a processing capability lower than that of the first game machine. A game information storage medium stores, in addition to a first game program executable on the first game machine, a second game program executable on the second game machine and an emulator program that converts the second architecture into the first architecture. When a predetermined condition is satisfied while a first game according to the first game program is being executed on the first game machine, it is possible to execute a second game according to the second game program using the emulator program.

13 Claims, 15 Drawing Sheets

U.S. PATENT DOCUMENTS

| | | | |
|---|---|---|---|
| 5,552,799 A | 9/1996 | Hashiguchi | |
| 5,575,717 A | 11/1996 | Houriet, Jr. et al. | |
| 5,577,180 A | 11/1996 | Reed | |
| RE35,520 E | 5/1997 | Darling et al. | |
| 5,667,440 A | 9/1997 | Sasaki et al. | |
| 5,807,173 A | 9/1998 | Aoyama | |
| 5,880,974 A | 3/1999 | Tarumi et al. | |
| 5,892,939 A | 4/1999 | Call et al. | |
| 5,959,596 A | 9/1999 | McCarten et al. | |
| 5,961,385 A | 10/1999 | Aoyama et al. | |
| 5,964,660 A | 10/1999 | James et al. | |
| 5,984,783 A | 11/1999 | Kikuchi et al. | |
| 5,984,786 A | 11/1999 | Ehrman | |
| 5,993,319 A | 11/1999 | Aoyama | |
| 6,009,458 A | 12/1999 | Hawkins et al. | |
| 6,015,348 A | 1/2000 | Lambright et al. | |
| 6,024,643 A | 2/2000 | Begis | |
| 6,056,640 A | 5/2000 | Schaaij | |
| 6,102,796 A | 8/2000 | Pajitnov et al. | |
| 6,106,395 A | 8/2000 | Begis | |
| 6,106,399 A | 8/2000 | Baker et al. | |
| 6,115,054 A | 9/2000 | Giles | |
| 6,132,315 A | 10/2000 | Miyamoto et al. | |
| 6,165,068 A | 12/2000 | Sonoda et al. | |
| 6,166,732 A | 12/2000 | Mitchell et al. | |
| 6,179,713 B1 | 1/2001 | James et al. | |
| 6,183,364 B1 | 2/2001 | Trovato | |
| 6,238,290 B1 | 5/2001 | Tarr et al. | |
| 6,238,291 B1 * | 5/2001 | Fujimoto et al. | 463/44 |
| 6,253,167 B1 | 6/2001 | Matsuda et al. | |
| 6,468,160 B2 | 10/2002 | Eliott | |
| 6,478,679 B1 * | 11/2002 | Himoto et al. | 463/36 |

OTHER PUBLICATIONS

MAME (http://web.archive.org/web/20000815230042/http://mame.net/readme.html) Aug. 15, 2000.*

Shih, Ming-yu, Readmee.txt, "SMYGB—Game Boy Emulator v0.20," (smy@ip.csie.ncu.edu.tw), HTTP://www.billyjr.com/smygb/ (Jan. 2, 1999).

"Snarkofagen's Emulation, The Latest Emulator News," HTTP://home.swipnet.se/snarkofagen/, (Nov. 15, 1999 to Dec. 29, 1999).

"NO$GMB—version 2.5, nocash gameboy emulator/debugger for dos/windows" HTTP://www.work.de/nocash/gmb.htm.

"Welcome to my Vgb page," HTTP://elekron.et.tudelft.nl/~jdegoede/vgb.html.

Bleem!™, Play hundreds of Playstation Games on Your PC, © 1998-1999.

Sample of remainder of print-out of Archive Games-U from www.worldofspectrum.org/games/u.html—1 page cover sheet, printed Nov. 27, 2001.

www.worldofspectrum.org/permits/, website and sample pp. 1 and 2 of 6, printed Nov. 27, 2001.

www.worldofspectrum.org/emulators.html, website and sample p. 1 of 7, printed Nov. 28, 2001.

www.worldofspectrum.org/games/u.html, website and sample p. 1 of 2, printed Nov. 28, 2001.

"MAME—The official Multiple Arcade Machine Emulator site" HTTP://www.mame.net, mame.net Copyright, 1997-2002 the MAME team, pp. 1-4.

* cited by examiner

FIG. 5
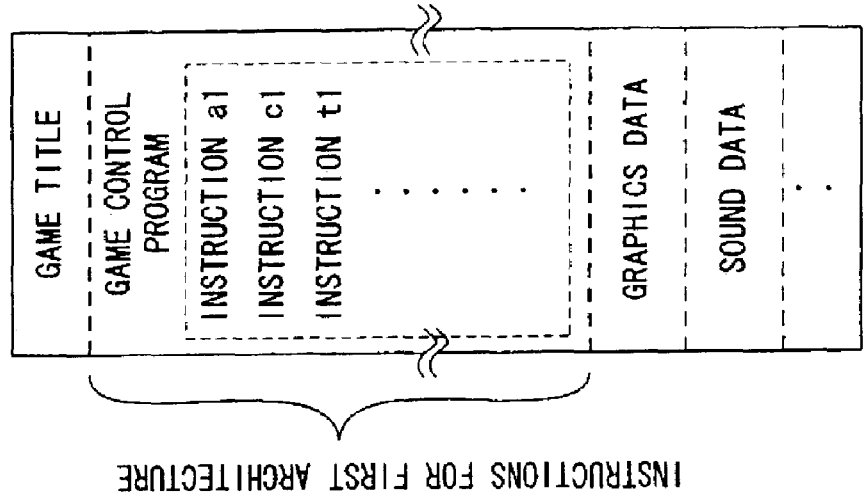
(c)
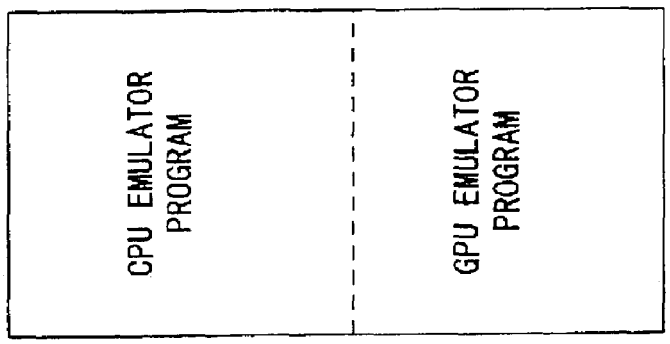
(b)
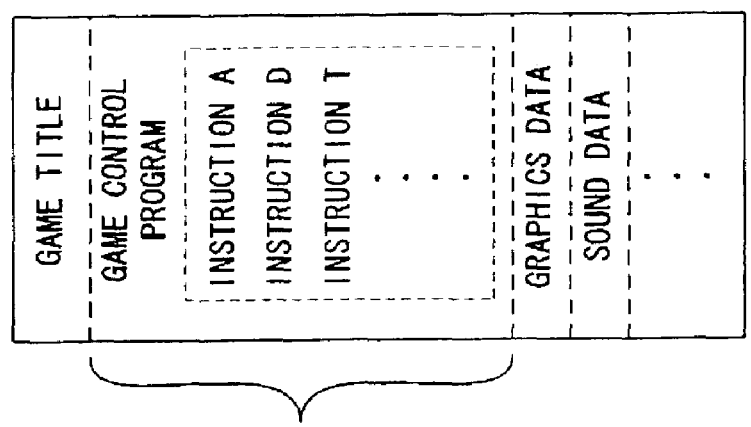
(a)

FIG. 6

| INSTRUCTIONS CONSTITUTING GAME PROGRAM FOR SECOND GAME MACHINE (INSTRUCTIONS OF SECOND ARCHITECTURE) | EMULATOR PROGRAM | |
|---|---|---|
| | CPU EMULATOR (INSTRUCTIONS OF FIRST ARCHITECTURE) | GPU EMULATOR (INSTRUCTION OF FIRST ARCHITECTURE) |
| INSTRUCTION A | PROCESSING a (INSTRUCTIONS, a1, a2, a3) | — |
| INSTRUCTION B | PROCESSING b (INSTRUCTION b1) | — |
| ... | ... | ... |
| INSTRUCTION J | PROCESSING j (INSTRUCTIONS j1, j2) | — |
| INSTRUCTION K + INSTRUCTION L | PROCESSING kl (INSTRUCTION kl1) | — |
| ... | ... | ... |
| INSTRUCTION T (EXCLUSIVE INSTRUCTION FOR GPU) | — | PROCESSING t1 + PROCESSING t2 + PROCESSING t3 (INSTRUCTIONS t11, t12, ...) |
| INSTRUCTION U (EXCLUSIVE INSTRUCTION FOR GPU) | — | PROCESSING u (INSTRUCTIONS u1, u2, u3) |
| ... | ... | ... |

GAME INFORMATION STORAGE MEDIUM AND GAME SYSTEM USING THE SAME

CROSS-REFERENCE TO RELATED APPLICATIONS

This application is a continuation-in-part application based on the (U.S. Ser. No. 09/774,660: filed on Feb. 1, 2001 now U.S. Pat. No. 6,955,606 based on a provisional application 60/206,977 filed on May 25, 2000), (U.S. Ser. No. 09/774,661: filed on Feb. 1, 2001 now abandoned based on the provisional application 60/206,977), (U.S. Ser. No. 10/217,140: filed on Aug. 13, 2002 now U.S. Pat. No. 6,951,516 based on a provisional application 60/313,470 filed on Aug. 21, 2001), the disclosures of which are herein incorporated by reference.

BACKGROUND OF THE INVENTION

1. Field of the Invention

The present invention relates to a game information storage medium, and a game system using the same. More specifically, the present invention relates to a game information storage medium and a game system using the same, in which a second architecture and a second game program executable by a second game machine having a processing capability lower than a first game machine are stored in a game information storage medium for a first game machine of a first architecture. An emulator is provided in the storage medium for converting the second game program for execution on the first game machine. A second game in accordance with the second game program is rendered playable on the first game machine as a premium when a predetermined condition is satisfied during a time that the first game according to the first game program in the first game machine is being played.

2. Description of the Prior Art

A conventional game system uses a game information storage medium, such as a cartridge having a semiconductor memory (ROM) or an optical storage medium such as a CD-ROM, and a game machine main body (video game machine or hand-held game machine) to which the game information storage medium is detachably attached. The game information storage medium stores a game program constructed by instructions based on architecture of a central processing unit (CPU) and a graphic processing unit (graphic IC; GPU) both incorporated inside the game machine to which the game information storage medium is attached.

Computer technology continues to improve the processing speed and/or processing capability of a CPU or the like. As a result, a game machine manufacturer has a tendency toward developing and marketing a game machine incorporated with a CPU or the like employing a new-type architecture corresponding to the then current technology. Incidentally, when a new-type game machine (higher-grade machine) is released, a game program of a game software for an older type game machine (lower-grade machine) released in the past generally can no longer be used in the higher-grade machine.

So-called roll playing games (RPG) are generally well known. The RPG is a game in which a user or a game player with a certain object or a role during the game experiences an adventure through a world being developed in the game, and lives in the world. Generally, the game player obtains a tool, a weapon, etc. called as an item, which are typically needed or helpful for achieving the object in the game. The item is obtained as a special favor or as a premium so as to proceed with the game using the item.

When playing such a game in a higher-grade game machine, it is conceivable that the game software for the lower-grade game machine could be obtained as the above-described premium, and played. In this case, in order to render playable the game software for the lower-grade game machine even in the high-grade game machine (to retain upward compatibility), the higher-grade game machine needs to be incorporated with not only a CPU and a GPU for the higher-grade game machine but also a CPU and a GPU for the lower-grade game machine.

On the other hand, as for another method for rendering playable the game software for the lower-grade game machine in the higher-grade game machine, it is thought to convert the game program for the lower-grade game machine into the game program for the higher-grade game machine.

In the former case in which two sets of CPUs and GPUs are provided, hardware structure of the higher-grade game machine becomes complicated and costly, which greatly increases a manufacturing cost of the higher-grade game machine. This is not practical. In the latter case of converting the program, a relatively long development time period is needed for developing the game program for the higher-grade game machine, thus increasing the development cost. Therefore, unless a relatively large number of sales are expected, it is difficult to justify the additional development costs needed to convert the program.

SUMMARY OF THE INVENTION

Therefore, it is a primary object of the present invention to provide a novel game information storage medium and a game system.

It is another object of the present invention to provide a game information storage medium and a game system capable of making a game program for a second game machine having a second architecture executable on a first game machine having a first architecture.

It is another object of the present invention to provide a game information storage medium and a game system capable of supplying game programs by storage into a common game information storage medium a game program for a game machine already on sale and employing an old-type architecture (older-type game machine or lower-grade machine or second game machine), and a game program for a game machine employing a new-type architecture (new-type game machine or higher-grade game machine or first game machine), and executing both the game program for the lower-grade game machine and the game program of the higher-grade game machine without changing the game information storage medium.

It is yet another object of the present invention to provide a game information storage medium, and a game system using the game information storage medium capable of using a game program of an old-type game machine on a new-type game machine, which is not accompanied by a large increase in a manufacturing cost of the new-type game machine.

It is another object of the present invention to provide a game information storage medium and a game system in which a game player obtains, without converting a program, as a gift or premium, an old-type game program having an architecture of different kind, and to be played on an old-type game machine already on sale so that the old-type game can be played on a new-type game machine while a new-type game to be essentially played on the new-type game machine is being played.

It is another object of the present invention to provide a game system capable of, when a different game machine having a capability superior to an old-type game machine capable of transmitting or receiving data to or from a new-type game machine playing a new-type game is connected to the new-type game machine, obtaining an old-type game machine as a gift or premium even on the different game machine so as to render the old-type game playable.

It is another object of the present invention to provide a game system capable of adding to a game information storage medium in which a new-type game program is stored, a game program for an old-type game machine in addition to a game program for the old-type game machine stored in advance as a gift or premium, thus equally possible to be supplied as a gift or premium.

In order to achieve these and other objects, the present invention provides a game information storage medium (16: reference numeral showing a corresponding portion in each embodiment) used by a first game machine employing a first architecture (12), and stores a first game program (92), a second game program (108), a first emulator program (100A), a gift or premium providing condition producing program (96*a*), a gift or premium providing condition detecting program (98*a*), and a selection state detecting program (100*a*).

The first game program is executed by the first game machine. The second game program is a program to be executed by a second game machine (not shown) having a processing capability lower than the first game machine and employing a second architecture different from the first architecture. The first emulator program is a program rendering executable the second game program on the first game machine by subjecting the second game machine to an emulation on the first game machine. The gift or premium providing condition producing program is a program for generating, when the first game program is executed by the first game machine, a condition for providing a gift or premium wherein the second game program is permitted to be executed on the first game machine. Gift or premium providing conditions detecting program is a program for detecting that the gift or premium providing condition is established while the first game program is being executed by the first game machine. The selection state detecting program is a program for detecting, after the gift or premium providing condition is detected, a state in which the second game program is selected to be executed by a player on the first game machine. As a result, it becomes possible for the first game machine to play a game dependent on the second game program on the first game machine through the execution of the second game program based on the first emulation program on the first game machine when a selection state is detected.

In a preferred embodiment, the above-described game information storage medium is an optical disk storage medium having quite a large storage capacity. The first game machine is incorporated with a first memory (72) which is capable of being written and read and has a storage capacity smaller than that of the optical disk storage medium, and larger than those of the first emulator program and the second game program. In addition, the game information storage medium further stores a reading-out program for reading-out information stored in the game information storage medium, that is, the optical disk storage medium. The reading-out program, prior to a game play by the first game machine, reads-out from the game information storage medium, that is, the optical disk storage medium, a portion of the first game program so as to write into the first memory, and reads-out from the game information storage medium, that is, the optical disk storage medium, the first emulator program and at least a portion of the second game program so as to write into the first memory when the selection state is detected by the selection state detecting program, thereby rendering possible to play a game dependent on the second game program on the first game machine through executions of the second game program based on the first emulator program on the first game machine.

The above-described second game program includes a plurality of game programs (108-1-108-n) for playing different kinds of games. In addition, the gift or premium providing condition producing program is made as a program for generating previously determined kinds of items (122) on a game screen image, displayed as a result of the first game machine executing the first game program, and generates a gift or premium providing condition for making the kinds of the second game program differ dependent on the kinds of items. The selection state detecting program specifies the kind the second game program selected by the player out of the kinds of the second game program in correspondence to the obtained kinds of items. In this way, the reading-out program reads-out from the game information storage medium the second game program of the kind selected and detected by the selection state detecting program and writes the same into the first memory.

The first game machine is connected to a third game machine (50) employing a third architecture having a processing capability higher than the second game machine, and being incorporated with a second writable/readable memory (84) and rendered possible to data-exchange between the third game machine. The game information storage medium further stores a second emulator program (100B), a connection detecting program (102), a delivering program (104), and a game machine selecting program (106). The second emulator program renders executable the second game program by subjecting the second game machine to an emulation on the third game machine. The connection detecting program detects that the third game machine is connected to the first game machine. The delivering program reads-out the second emulator program and at least one second game program and delivers the same to the third game machine, and then the game machine selecting program allows a player to select playing the second game program whether on the first game machine or on the third game machine after the gift or premium providing condition is detected. The first game machine transfers the second emulator program and the second game program from the game information storage medium to the third game machine based on the delivering program when detecting by the game machine selecting program that the second game program is selected to be played on the third game machine, and then writes into the second memory.

Furthermore, the game information storage medium further stores a switching program for switching to an execution of the first game program when the first game machine which is executing the second game program detects a previously determined switching condition (S37).

Moreover, the first game machine can be connected with the game information storage medium and the second information storage medium at the same time. Then, the game information storage medium further stores a second gift or premium providing condition producing program (96*b*), a second gift or premium providing condition detecting program (98*b*), and a second selection state detecting program (100b). The second gift or premium providing condition producing program is a program for rendering selectable at least one game program for the second game machine, which is stored in the second information storage medium. The second gift or premium providing condition detecting program is a program for detecting that a condition is satisfied, in which the gift or premium stored in the second information storage medium becomes capable of being provided to a player based on the second gift or premium providing condition producing program. The second selection state detecting program is a program for detecting a condition selected by a player, in which the second game program stored in the second information storage medium is to be executed on the first game machine based on the second gift or premium providing condition producing program. Thereby, the first game machine reads-out from the second information storage medium the selected game program so as to start an execution based on the emulator program when the second selection state detecting program is executed and at least one game program stored in the second information storage medium is capable of being selected by the player.

In a certain aspect of the present invention, a first game machine (12) capable of being connected to a third game machine (50) employing a third architecture having a processing capability higher than a second game machine (not shown), and being incorporated with a second writable/readable memory (84) and capable of data-exchange between the third game machine. The game information storage medium stores a first game program (92) executed by the first game machine, at least one second game program (108), a second emulator program (100B), a gift or premium providing condition producing program (94*b*), a gift or premium providing condition detection program (98*b*), a selection state detecting program (100*b*), a connection detecting program (102), and a delivering program (104).

The second game program is a program to be executed by a second game machine employing a second architecture having a processing capability lower than both the first game machine and the third game machine, and different from the first game machine. The second emulator program is a program for allowing the second game program to be executed on the third game machine by subjecting the second game machine to an emulation on the third game machine. The gift or premium providing condition producing program is a program for generating a condition in which a gift or premium, rendering executable the second game program at least on the second game machine, is provided to a player when the first game program is being executed by the first game machine. The gift or premium providing condition detection program is a program for detecting that the gift or premium providing condition is satisfied when the first game program is being executed by the first game machine. The selection state detecting program is a program for detecting a condition that the second game program is selected to be executed on the third game machine by the player after the gift or premium providing condition is detected. The connection detecting program is a program for detecting that the third game machine is connected to the first game machine. The delivering program is a program for reading-out the second emulator program and at least one second game program so as to deliver both to the third game machine.

Then, the first game machine reads-out, based on the delivering program, from the game information storage medium the second emulator program and at least one second game program, and writes the same into the second memory when the selection state is detected and it is detected that the third game machine and the first game machine are connected to each other, thereby executing the second game program on the third game machine based on the second emulation program, rendering playable a game dependent on the second game program on the third game machine.

In this case, the game information storage medium further stores a first emulator program (100A), and a game machine selecting program (106). The first emulator program is a program for rendering executable the second game program by subjecting the second game machine to an emulation on the first game machine, and the game machine selecting program is a program for allowing, after the gift or premium providing condition is detected, the player to select playing the second game program whether on the first game machine or on the third game machine. Thereby, the first game machine writes into a first memory included in the first game machine the first emulator program and the second game program when it is detected that the second game program is selected to be played on the first game machine by the game machine selecting program. Furthermore, the second game program is played on the first game machine based on the first emulator program.

Furthermore, the game information storage medium is an optical disk storage medium having quite a large storage capacity, and the first game machine is incorporated with a first writable/readable memory (72) having a storage capacity smaller than that of the optical disk storage medium and larger than those of the second emulator program and the second game program. The game information storage medium further stores a reading-out program for reading-out information stored in the game information storage medium, that is, the optical disk storage medium. The reading-out program, prior to a game play by the first game machine, reads-out from the game information storage medium, that is, the optical disk storage medium, a portion of the first game program so as to write into the first memory, and reads-out, when a selection detection is performed by the selection detection program, from the game information storage medium, that is, the optical disk storage medium the second emulator program and at least a portion of the second game program so as to write into the second memory, and thereafter, the second game program is executed by referring to the second emulator program on the third game machine, rendering playable the game dependent on the second game program on the third game machine.

Another aspect of the present invention is a game system in which, by a first game machine (12) employing a first architecture that executes a program stored in a game information storage medium (16), providing a game for a second game machine (not shown) employing a second architecture different from a first architecture, and having a processing capability lower than the first game machine on a third game machine employing a third architecture having a processing capability higher than the second game machine.

The first game machine is rendered connectable to data transmission/reception unit (52, 54) that is connected to the third game machine so as to exchange data. The third game machine is incorporated with a second memory (84) for storing data transmitted and received between the first game machine via the data transmission/reception unit, and the game information storage medium stores a first game program (92), at least one second game program (108), a connection detecting program (102), a second emulator program (100B), a gift or premium providing condition producing program (96*b*), a gift or premium providing condition detecting program (98*b*), a selection state detecting program (100*b*), and a delivering program (104).

The first game program is a program executed, essentially, by the first game machine. The second game program is a program, essentially, executed by the second game machine. The connection detecting program is a program for detecting that the third game machine is connected to the first game machine. The second emulator program is a program for rendering executable the second game program on the third game machine by subjecting the second game machine to an emulation on the third game machine. The gift or premium providing condition producing program is a program for generating a condition that a gift or premium rendering executable the second game program at least on the second game machine is provided to a player when the first game program is being executed by the first game machine. The gift or premium providing condition detecting program is a program for detecting that the gift or premium providing condition is satisfied when the first game program is being executed by the first game machine. The selection state detecting program is a program for detecting a state that the second game program is selected to be executed on the third game machine by the player after the gift or premium providing condition is detected. The delivering program is a program that reads-out the second emulator program and at least one second game program so as to deliver to the third game machine.

Furthermore, the first game machine, when the selection state is detected, and it is detected that the third game machine and the first game machine are connected to each other, reads-out from the game information storage medium the second emulator program and at least one second game program based on the delivering program, and then writes the same into the second memory via the data transmission/reception means. Thereby allowing the second game program to be executed on the third game machine based on the second emulator program, rendering playable a game play based on the second game program on the third game machine.

In a preferred embodiment of this aspect, the game information storage medium further stores a first emulator program (100A), and a game machine selecting program (106). The first emulator program is a program for rendering executable the second game program by subjecting the second game machine to an emulation on the first game machine, and the game machine selecting program is a program for allowing a player to select the second game program whether on the first game machine or on the third game machine after the gift or premium providing condition is detected.

Then, the first game machine, when it is detected that the second game program is selected to be played on the first game machine by the game machine selecting program, writes the first emulator program and the second game program into the first memory included in the first game machine. Thereby allowing the second game program to be played on the first game machine based on the first emulator program.

Furthermore, the above-described game information storage medium is an optical disk storage medium having quite a large storage capacity. The first game machine is incorporated with a first writable/readable memory (72) which has a storage capacity smaller than that of the optical disk storage medium and larger than those of the second emulator program and the second game program. Then, the game information storage medium further stores a reading-out program for reading-out information stored in the game information storage medium, that is, the optical disk storage medium. The reading-out program, prior to a game play by the first game machine, reads-out from the game information storage medium, that is, the optical disk storage medium a portion of the first game program so as to write into the first memory, and then, reads-out, when a selection detection is performed by the selection detection program, from the game information storage medium, that is, the optical disk storage medium the second emulator program and at least a portion of the second game program so as to write into the second memory. Thereafter, the first game machine executes the second game program by referring to the second emulator program on the third game machine, rendering playable a game dependent on the second game program on the third game machine.

Yet another aspect of the present invention is a game system in which, by a first game machine (12) employing a first architecture that executes a program stored in a first information storage medium (16) storing a game program, providing a game for a second game machine employing a second architecture different from the first architecture, and having a processing capability lower than the first game machine.

The first game machine is rendered connectable to, as well as a second information storage medium (32), the first information storage medium at the same time. The first information storage medium stores a first game program (92), at least one second game program (108), a first emulator program (100A), a gift or premium providing condition producing program (96*a*), a gift or premium providing condition detecting program (98*a*), a selection state detecting program (100*a*). The first game program is a program executed by the first game machine. The second game program is a program to be executed by the second game machine. The first emulator program is a program for rendering executable the second game program on the first game machine by subjecting on the first game machine the second game machine to an emulation. The gift or premium providing condition producing program is a program for generating a condition for providing a gift or premium that the second game program is permitted from being executed on the first game machine when the first game program is being executed by the first game machine. The gift or premium providing condition detecting program is a program for detecting that the gift or premium providing condition is satisfied when the first game program is being executed by the first game machine. The selection state detecting program is a program for detecting a state in which the second game program is selected to be executed on the first game machine by the player after the gift or premium providing condition is detected.

The second information storage medium stores a program for the second game machine different from the first information storage medium, and the first information storage medium further stores a second gift or premium providing condition producing program (96*b*), a second gift or premium providing condition detecting program (98*b*), and a second selection state detecting program (100*b*). The second gift or premium providing condition producing program is a program for rendering selectable at least one game program for the second game machine stored in the second information storage medium. The second gift or premium providing condition detecting program is a program for detecting a condition is satisfied, in which the gift or premium stored in the second information storage medium becomes applyable, based on the second gift or premium providing condition detecting program. The second selection state detecting program is a program for detecting a state that the second game program stored in the second information storage medium is selected to be executed on the first game machine by the player based on the second gift or premium providing condition detecting program, thereby allowing the first game machine to read-out the selected game program from the second information storage medium so as to start an execution based on the emulator program when the second selection state detecting program is executed, and at least one game program stored in the second information storage medium is selectable by the player.

According to the present invention, the game program for the second game machine employing the second architecture (lower-grade machine or old-type game machine), and the game program for the first game machine employing the first architecture (higher-grade machine or new-type game machine) can be stored into a common game machine so as to be available. Therefore, both the second game program and the first game program can be played without requiring an exchange of the storage medium.

Furthermore, according to the present invention, the game program of the old-type game machine (second game machine) can also be used in the new-type game machine, without causing a large increase in the manufacturing cost of the new-type game machine (first game machine).

Moreover, according to the present invention, it is possible to provide a very interesting game capable of being played as a result of a game player, while playing the original first game on the first game machine, obtaining, without converting the program, as a gift or premium the game program for the second game machine having a different architecture.

In addition, according to the present invention, when the first game machine and the third game machine are connected to each other, it is possible to play the second game program for the second game machine obtained as a gift or premium even on the third game machine.

Furthermore, according to the present invention, it is possible to provide as a gift or premium, by adding to the game information storage medium, the game program for the second game machine different from the second game program stored in advance as a gift or premium.

The above described objects and other objects, features, aspects and advantages of the present invention will become more apparent from the following detailed description of the present invention when taken in conjunction with the accompanying drawings.

BRIEF DESCRIPTION OF THE DRAWINGS

FIG. 5 is an illustrative view showing details of stored data in the FIG. 1 embodiment;

FIG. 6 is an illustrative view showing one example of an emulator program;

DETAILED DESCRIPTION OF THE PREFERRED EMBODIMENTS

Figure 1:
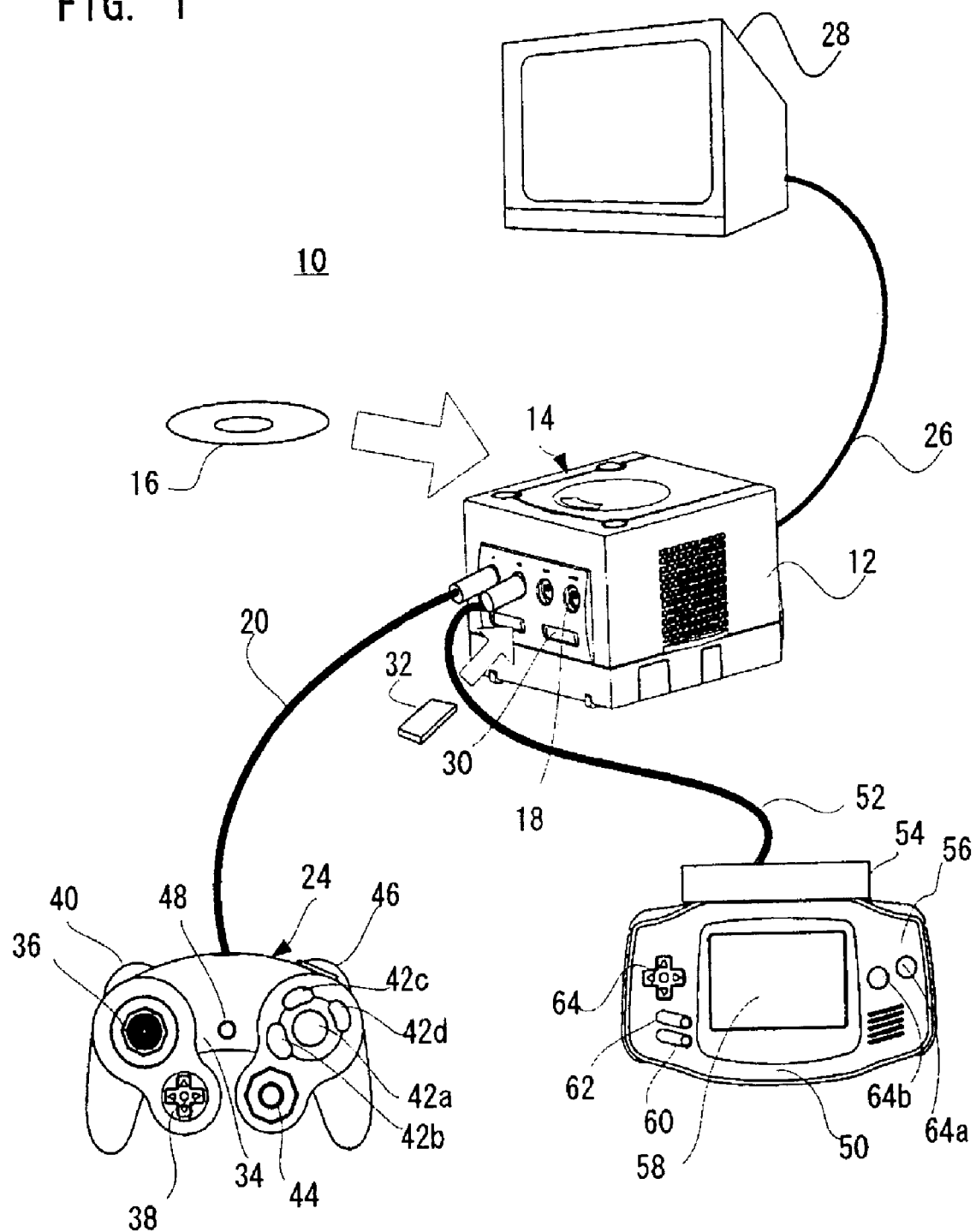
FIG. 1 is an illustrative view showing one example of a game system to which the present invention is applicable.

Referring to FIG. 1, a game system 10 of this exemplary embodiment includes a video game machine 12, which is a higher-grade machine or a new-type game machine or a first game machine, and a game information storage medium 16 detachably attached to a disk drive 14 provided on the video game machine 12. As for the game information storage medium 16, an optical disk recording medium, such as a DVD-ROM and a CD-ROM, and various kinds of large-capacity storage media, such as a high density magnetic storage medium or a semiconductor storing device, etc. may be used. However, the optical disk storage medium is used in the exemplary embodiment described below.

The video game machine 12 in this embodiment is "NINTENDO GAMECUBE" (trademark) manufactured and marketed by the applicant, and corresponds to the first game machine or the new-type game machine or the higher-grade machine employing a first architecture. Although not shown in FIG. 1, as for a second game machine or an old-type game machine or a lower-grade game machine employing a second architecture, "NINTENDO ENTERTAINMENT SYSTEM: NES" (trademark) is envisioned, for example. A hand-held game machine 50, described later is a "GAMEBOY ADVANCE" (trademark) manufactured and marketed by the applicant is also envisioned in this embodiment, for example. However, it is noted that the hand-held game machine 50 employs a third architecture in this embodiment, and therefore, it functions as a third game machine other than the above-described first game machine and the second game machine.

On a front surface of the video game machine 12, a plurality of (four, in this embodiment) connectors 18 are provided. The video game machine 12 includes a game controller (briefly referred to as "controller") 24, i.e. an example of an operating device for instructing movement of a character (also called an object) for the game or a cursor, and an operation of the character, connected by a connector 18 and a connection cable 20. A television monitor 28, i.e. an example of a displaying apparatus for displaying a game screen, is also connected via a cable 26. As for the television monitor 28, in addition to a CRT, a liquid crystal display, a plasma display, etc. may be used. Furthermore, on the front surface of the video game machine 12, a plurality (two, in this embodiment) of card connectors 30 are provided, and a memory card 32 for back-up storing of a progressive result of the game as desired is detachably attached to the card connector 30.

The controller 24 has a housing 34, and an analog joystick 36 and a cross key 34 (digital joystick) 38, each of which is for instructing a movement direction for the character or the object etc., are provided on an upper left side of the housing 34. The analog joystick 36 is used for inputting, by an inclination amount and a direction of the stick, a moving direction and/or a moving speed or a moving amount, etc. of the player character (moving image character that is operable by the player, using the controller 24). The cross key 38 is used for instructing a moving direction of the player character in place of the analog joystick 36. At a left side surface of the housing 34, a left switch 40 is provided. The operating means 36, 38, and 40 are operated by a left hand of the game player holding the controller 34.

Furthermore, an A button switch 42a is provided on an upper right side of the housing 34, and a B button switch 42b, a C button switch 42c, and a D button switch 42d are aligned as if to surround the A button switch 42a. Each of these button switches 42a, 42b, 42c, and 42d is used for instructing a movement of the player character, canceling an instruction and an input from the controller 24, switching a point of view of a virtual camera of a three-dimensional image, an adjustment of the moving speed of the player character, etc., the button switches further control menu selection, a pointer cursor movement, etc., for example. It is noted that these four button switches may collectively be called a button switch 42. At a near side of the button switch 42, another analog joystick 44 is provided for manually changing a position of the virtual camera of a 3D game image, for example. In addition, a right switch 46 is provided at a right of the side surface of the housing 34. The operating devices 42, 44, and 46 are operated by a right hand of the game player holding the controller 34.

In addition, at a center of the front side of the housing 34 of the controller 24, a start key 48, which is sandwiched by a left hand operating device and a right hand operating device, is provided. The start key 48 is used for starting executing the game.

Furthermore, in the game system 10 in FIG. 1, the hand-held game machine 50 is connected to the front surface connector 18 of the video game machine 12, using a communication cable 52. That is, a connector 54 of the communication cable 52 is connected to a communication connector (not shown) provided on a side surface of the hand-held game machine 50, thus enabling a data transmission/reception or a data exchange between the hand-held game machine 50 and the video game machine 12.

The hand-held game machine 50 includes a housing 56, and includes an LCD (Liquid Crystal Display) 58 provided at a center of its front surface of the housing 56. At a left side of the LCD 58, a start key 60, a select key 62, and a moving instruction key (cross key) 64 are provided. In addition, at a right side of the LCD 58 of the hand-held game machine 50, an A button switch 66a and a B button switch 64b are provided. The start key 60 is used for instructing a start of the game. The select key 62 is used for selecting a game mode, etc. Similar to the previous cross key 38, the cross key 64 instructs a moving direction of the game character, for example. The A button switch 64a, similar to the previous A button switch 42a, instructs a movement of the game character, and the B button switch 64b is used for canceling the instruction and the input. It is noted that in FIG. 2, the respective switches or keys of the hand-held game machine 50 are collectively shown as an operating switch 66.

Figure 2:
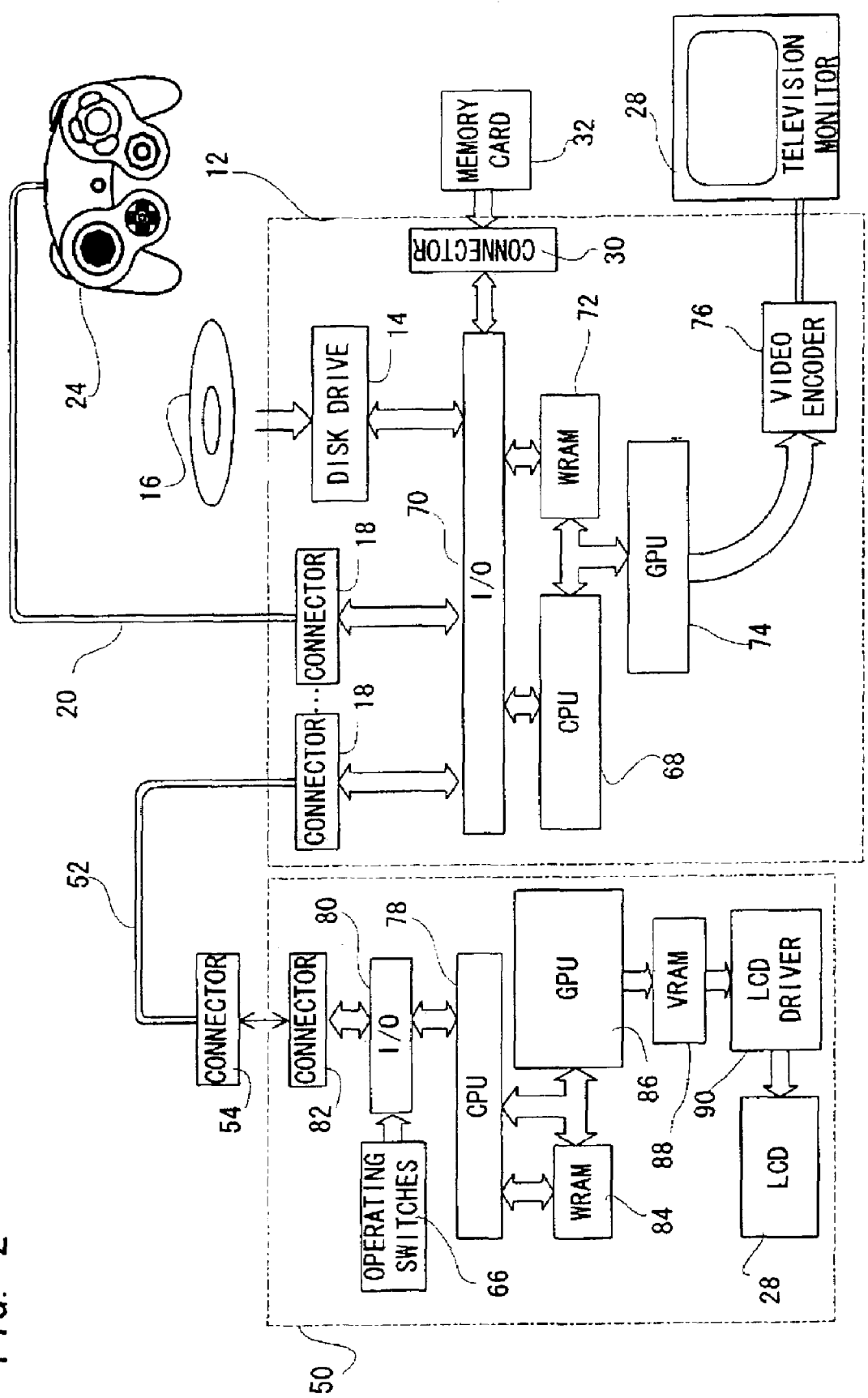
FIG. 2 is a block diagram showing the FIG. 1 embodiment.

Referring to FIG. 2, the video game machine 12 includes a high speed or high-grade CPU 68, for example. The CPU 68 processes an instruction in accordance with the first architecture in order to control the whole operation of the video game machine 12. An input/output interface (hereinafter called "I/O") 70 is connected to the CPU 68. In addition to the above-described connectors 18, a disk drive 14 is connected to the I/O 70. The hand-held game machine 50 is connected to the video game machine 12 via one connector 18 as described above, and the above-described controller 24 for instructing a movement and an operation of the game character is connected thereto via another connector 18. Furthermore, in addition to a working RAM (WRAM) 72, a GPU 74 is connected to the CPU 68. The GPU 74 is a graphic processing unit, and graphics data generated by the GPU 74 is converted into a television signal (RF signal or RGB signal) by a video encoder 76, and the television signal from the video encoder 76 is applied to the television monitor 28. Therefore, a game screen in accordance with the graphics data generated by the GPU 74 is displayed on the television monitor 28.

It is noted that the memory card 32 is connected to the above-described CPU 82 through the I/O 80 and the card connector 30.

The CPU 74 carries out a process for an image display such as a geometry operation process, a rendering process, and etc. in accordance with an instruction from the CPU 68. The WRAM 72 is a working RAM for appropriately storing an operation result of the CPU 68, and etc., and storing program data read-out from the game information storage medium 16 (a game program for the first game machine or a game program for the second game machine and an emulator program).

It is noted that the memory card 32 is incorporated with a writable/readable semiconductor memory such as an S-RAM, a flash memory, etc., thereby making it possible to temporarily store progressive data of the game, and restart (replay) from an existing state in the game when being read after a game-over as desired, and in addition, it is also possible to supply from outside additional data used for the game.

More specifically, the above-described CPU 68 is used for processing an instruction of the architecture of a first kind, and in addition to controlling or managing the entire game system based on, when starting, an operating system (OS) program stored in a program ROM (not shown) incorporated in the video game machine 12, the CPU 68 carries out a process for a game based on the game program read-out by the disk drive 14 from the game information storage medium 16 when the game information storage medium 16 is attached thereto. For example, the CPU 68 carries out processes, based on the game program, other than a graphic processing such as a reading control of recorded data of the game information storage medium 16, a writing or reading control of the WRAM 72, a reading control of input data by the controller 24, a control of the GPU 74, various kinds of operation processings for the game process, etc. Furthermore, the CPU 68 receives the input signal from the controller 24 through the I/O 70, and carries out a process in such a manner as to affect the game image in response to the input signal.

It is noted that as described above, the game information storage medium 16 is an optical disk storage medium having quite a large storage capacity, 1 GB or 2 GB or more, for example. On the other hand, the WRAM 72 is a memory for loading at once or sequentially as required the necessary data from the game information storage medium 16. Therefore, although a storage capacity of the WRAM 72 is smaller than that of the game information storage medium 16, it at least has a storage capacity sufficient enough to simultaneously load a first emulator program 10A, and at least one second game program 108 (both in FIG. 4) described later.

The hand-held game machine 50 includes a CPU 78 having a processing capability higher than that of the second game machine but lower than that of the CPU 68, for example. The CPU 78 processes an instruction in accordance with a second architecture in order to control the whole operation of the hand-held game machine 50. An I/O 80 is connected to the CPU 78. In addition to a connector 82, the above-described operating switch 66 for instructing the movement and an operation of the game character is connected to the I/O 80. Furthermore, in addition to a WRAM 84, a GPU 74 is connected to the CPU 78. The GPU 74 is a graphic processing unit, and graphics data generated by the GPU 74 is applied to an LCD driver 90 via a VRAM 88. Therefore, a game screen according to the graphics data generated by the GPU 74 is displayed on the LCD 58.

Furthermore, the above-described WRAM 84 is a memory for loading all at once or sequentially as required the necessary data from the optical disk storage medium 16, and therefore, a storage capacity of the WRAM 84 is smaller than that of the game information storage medium 16. However, at least, the working RAM has a storage capacity sufficient enough to simultaneously load a second emulator program 100B, and at least one second game program 108 (both in FIG. 4) described later.

The connector 54 of the communication cable 52 is inserted into and connected to the above-described connector 82 of the hand-held game machine 50. The communication cable 52 is connected to the aforementioned connector 18 of the video game machine 12. Therefore, a data exchange is made possible between the CPU 78 of the hand-held game machine 50 and the CPU 68 of the video game machine 12, which means the communication cable 52 and the relevant connectors function as a data transmission/reception means.

Figure 3:
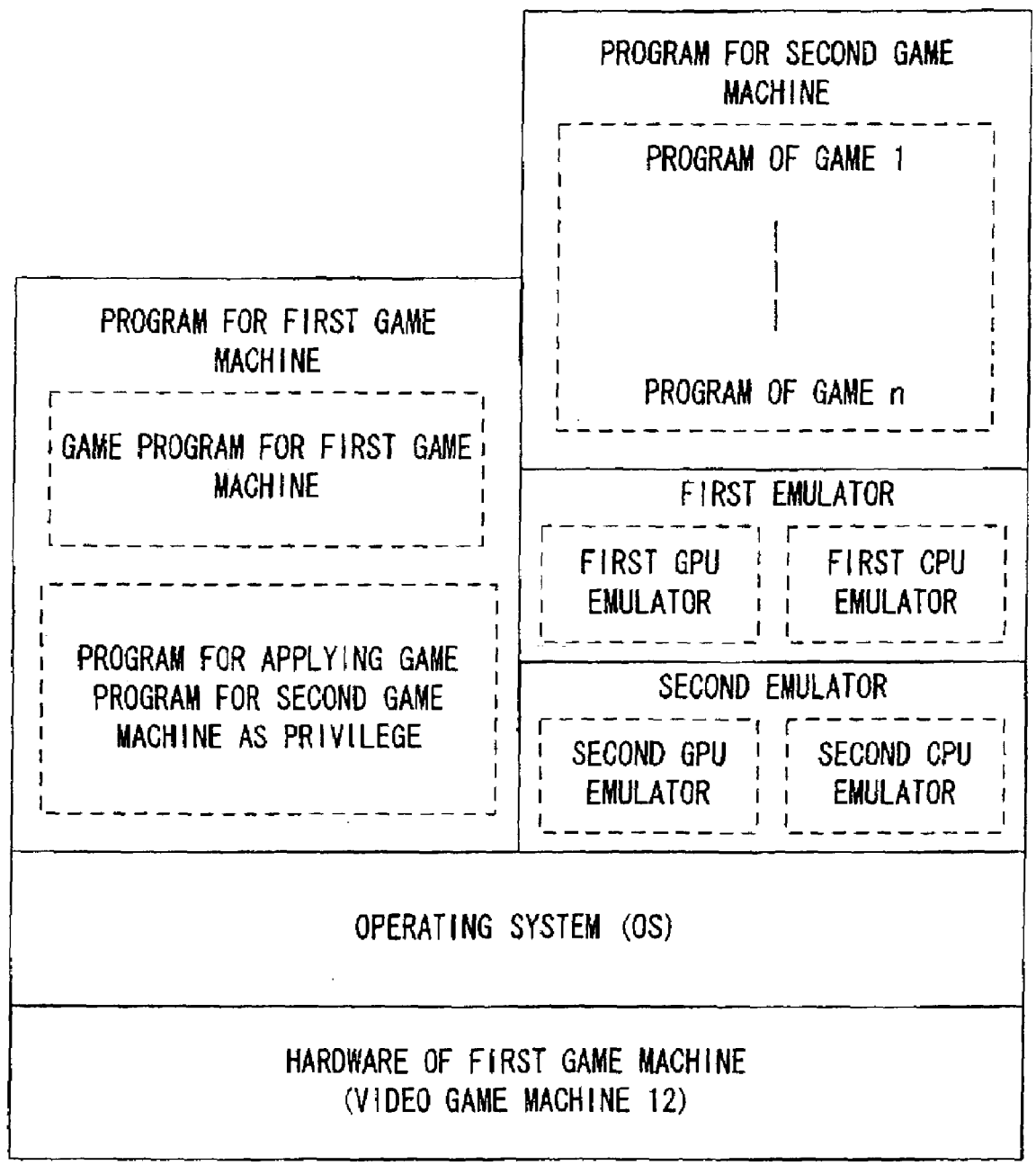
FIG. 3 is an illustrative view showing hierarchical structure of hardware, an operating system (OS), and various kinds of programs in the game system of the FIG. 1 embodiment.

A hierarchical structure of the hardware, an operating system (OS) and a various kinds of programs of the FIG. 1 embodiment is illustrated in FIG. 3. In this FIG. 3, a program of the OS stored in an internal ROM (not shown) is executed on the hardware (CPU 68) of the video game machine 12 (first game machine). When the program read-out from the game information storage medium 16 is for the first game machine, that is, the video game machine 12, the game program for the first game machine is processed on the OS program (or by the CPU 68 via the OS program). Likewise, a provided program included in the program for the first game machine, which is for providing the game program for the second game machine as a gift or premium, can be operated by the OS program or the CPU 68 via the OS program.

On the other hand, when the program read-out from the game information storage medium 16 is the program for the second game machine, this is not to be processed on the OS of the first game machine as it is. In this case, in order to render executable the game program for the second game machine on the OS of the first game machine, an emulator for converting the game program for the second game machine having the second architecture into the first architecture for the first game machine is run on the OS, and then, the game program for the second game machine is run on the emulator, thereby resulting in the similar process as in a case of using a two-layered OS.

Herein, a relationship between the video game machine 12, i.e. the first game machine (higher-grade machine) and the second game machine (lower-grade machine; not shown) will be described. The game machines use a different architecture, and therefore, essentially, no compatibility exits therebetween in terms of hardware. If the CPU of the second game machine is a lower-grade machine, the CPU 68 of the video game machine 12 is a higher-grade machine, which is one or two ranks higher (for example). That is, for the CPU 68, a CPU having a processing capability and/or a processing speed far higher than that of the second game machine is used. In this case, if the game program for the second game machine having a different architecture is processed on the first game machine, that is, the video game machine 12, a malfunction occurs as a result thereof because an instruction language is different. In order to prevent this, an emulator program is used for converting the game program for the second game machine into the architecture for the first game machine. The emulator program includes an operation process-use emulator (CPU emulator), and a graphic processing-use emulator (GPU emulator), for example. More specifically, the CPU emulator is a program for converting the instruction language or a function processed by the CPU of the second game machine into the architecture adapted to the CPU 68 of the first game machine as shown in FIG. 5(b), for example. The GPU emulator is a program for converting a graphic processing function processed by the graphic processing unit (GPU) of the second game machine into the function or the architecture adaptable to the CPU 74 of the first game machine. When a predetermined condition is established during a time that the game program for the second game machine is being operated, the program for the second game machine and the first emulator program are read-out from the game information storage medium 16, and then, stored into the WRAM 72 or the program for the second game machine and the first emulator program previously stored prior to a start of the game in the WRAM 72 are rendered executable.

However, the second emulator program stored in the WRAM 84 is also constructed similarly to the first emulator program.

It is noted that when the second game machine is of extremely low processing capability while the CPU of the first game machine 12 has more than two ranks higher processing capability (having a newest processing capability), it is possible to achieve both functions of the operation processing, and the graphic processing by only the CPU 68 in a time-sharing manner, not requiring the first game machine 12 to be provided with the CPU 74. In addition, a high-speed computer may also be used for executing the game program as the first game machine, not the exclusive machine for the game machine.

Figure 4:
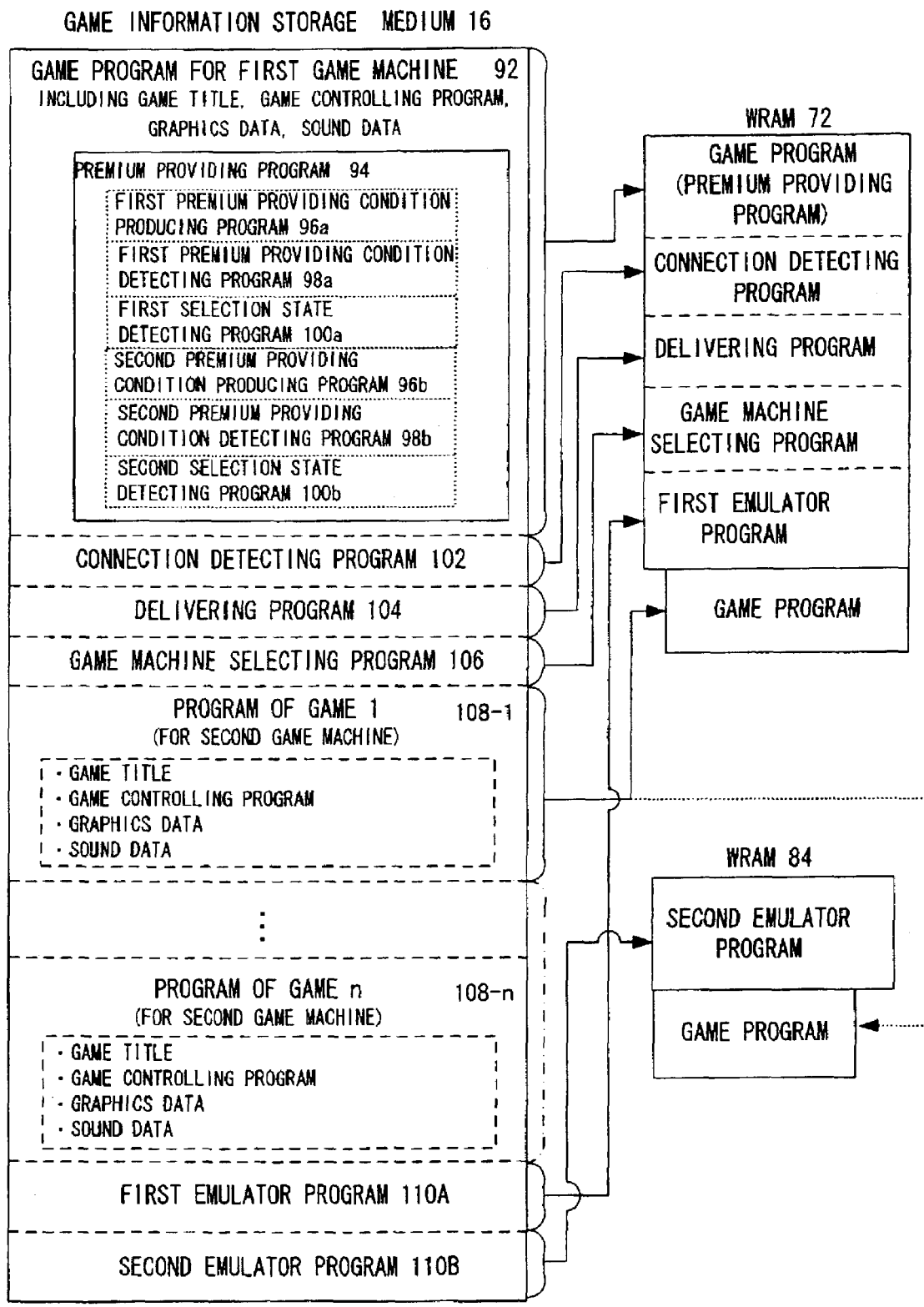
FIG. 4 is an illustrative view showing a memory map of a game information storage medium and one example of a relationship between programs stored in the medium and respective areas of a WRAM.

FIG. 4 is a memory map illustratively showing stored data of the game information storage medium (DVD-ROM) 16 of the FIG. 1 embodiment, and in a FIG. 4 example, a game program for the first game machine 96 is stored in the game information storage medium 16, and the game program for the first game machine 96 includes a game title, programs for controlling the game, data for image-displaying (and/or graphic processing program), and sound data (or sounds or voices program) for sound processing, for example. It is noted that the first game machine corresponds to a high-grade machine of NINTENDO GAMECUBE (trademark) e.g., using the video game machine marketed by the applicant as an example.

Although not shown in FIG. 4, as described earlier, a first game program 92 includes respective programs for controlling a reading-out of the recorded data of the game information storage medium 16, a writing or a reading-out of the WRAM 72, a reading the input data by the controller 24, the GPU 74, and the processings other than the image processing such as various kinds of operations processings for the game processing. The game program for the first game machine further includes a gift or premium providing program 94 capable of providing a gift or premium while the first game program 92 is being executed. The gift or premium providing program 94 includes first and second gift or premium providing condition producing programs 96a and 96b, first and second gift or premium providing condition detecting programs 98a and 98b, and first and second selection state detecting programs 100a and 100b. The gift or premium providing condition producing programs 96a and 96b (may collectively be referred to "96") are programs for producing or generating a condition that the gift or premium is provided to a game player when it is established or satisfied during a time that the first game is being executed. More specifically, the gift or premium providing condition producing program 96 is a program for producing predetermined kinds of items (gift 122 shown in FIG. 8 and FIG. 9 described later, for example) in a game screen image displayed as a result of the first game machine executing the first game program. The gift or premium providing condition detecting programs 98a and 98b (may collectively be referred to "98") are programs for detecting whether or not the gift or premium providing condition produced by the above-described gift or premium providing condition producing program is established or satisfied during a time that the first game is being executed. The selection state detecting programs 100a and 100b (may collectively be referred to "100") are programs for detecting such a state that an execution of the game program for the second game machine provided as a gift or premium is selected to be expected on the first game machine by a game player during a time that the first game is being executed. More specifically, the selection state detecting program is a program for specifying the kind that the player selects out of the programs of second game of the kind corresponding to the kind of the obtained items.

It is noted that the second gift or premium providing condition producing program 96b is a program for rendering selectable at least one game program for the second game machine stored in the second information storage medium, that is, the memory card 32. The second gift or premium providing condition detecting program 98b is a program for detecting a condition in which the gift or premium stored in the memory card is rendered providable is established based on the second gift or premium providing condition producing program 96b. The second selection state detecting program 100b is a program for detecting a state that the second game program stored in the memory card 32 is selected to be executed on the video game machine 12 by the player based on the second gift or premium providing condition detecting program 98b.

Furthermore, a connection detecting program 102, a delivering program 104, and a game machine selecting program 106 are previously stored in the game information storage medium 16. The connection detecting program 102 is a program for detecting whether or not the hand-held game machine 50 is connected to the first game machine, that is, the video game machine 12 as shown in FIG. 1. The delivering program 104 is a program for delivering the game program for the second game machine as required from the first game machine, that is, the video game machine 12 to another game machine, that is, the hand-held game machine 50. Then, the game machine selecting program 106 is a program for selecting any one of the above-described game machines as the second game machine. That is, the game machine selecting program 106 is a program for allowing the player to select the second game program whether to play on the first game machine 12 or play on the third game machine 50 after the gift or premium providing condition is detected.

As described before, a plurality of game programs 108-1-108-n (program of game 1, . . . program of game n) applied to the old-type game machine or the lower-grade game machine or the second game machine are stored in the game information storage medium 16. Similar to the first game program, the game title, the programs for controlling the game, the data for image-displaying (and/or graphic processing program), and the sound data (or sounds or voices program) for sound processing are included each of the second game programs 108-1-108-n. It is noted that the second game programs 108-1-108-n may be referred to as a second game program 108 unless otherwise necessary to distinguish the respective programs, in particular.

It is noted that both the first emulator program 110A and the second emulator program 110B are emulator programs for converting the second architecture operating, on which the old-type game machine or the lower-grade machine or the second game machine is based, into the first architecture for the new-type game machine or the higher-grade machine or the first game machine, and include an operation process-use emulator (CPU emulator), and a graphic processing-use emulator (GPU emulator) (see FIG. 5(b)).

Of such programs and the data of the game information storage medium 16, the first game program 92 is, along with the gift or premium providing program 94, loaded into the first game machine, that is, the WRAM 72 of the first game machine 12. In addition, the connection detecting program 102, the delivering program 104, and the game machine selecting program 106 are loaded from the game information storage medium 16 into the WRAM 72. In addition thereto, the first emulator program 110A and the second game program 108 are loaded into the WRAM 72.

Furthermore, along with the second emulator program 110B, the second game program 108 is loaded into the WRAM 84 of the hand-held game machine 50.

Details of the above-described emulator programs will be described later referring to FIG. 11, and this program is realized by a conversion table of instruction languages, and etc., for example, on which an instruction for the second game machine is converted into an instruction for the first game machine as shown in FIG. 5. Therefore, each instruction included in the game controlling program (A, D, T, for example) is an instruction not directly comprehensible by the CPU 68 (and/or GPU 74), and it is not until being converted using the emulator program that the instruction becomes executable by the CPU 68 and the GPU 74.

FIG. 6 is a view illustratively showing an example of the emulator program. In FIG. 6, the emulation program stores in advance a plurality of instructions to be connected and converted instructions each corresponding to each of the instructions in a conversion table such that upon receipt of each instruction (A, B, . . . , J or K+L) constituting the game program for the second game machine, the instructions can be converted into instructions for instructing the processes, which correspond to the instructions, to be carried out by the CPU 68(a, b, . . . , j or kl). Then, the instruction is converted into a CPU 68-use instruction corresponding to the received instruction before being supplied to the CPU 68 every time that the instruction for the second game machine is applied, thereby subjecting the instruction to an emulation. More specifically, when the instruction A of the game program for the second game machine is applied, it is converted into an instruction adapted to an architecture of the game program for the second game machine corresponding to the instruction A, and then, the process a corresponding to the instruction is carried out. The process a may be constructed by a plurality of instructions a1-a3 by the architecture of the first game machine 12, for example. Furthermore, in a case that the instruction by the game program for the second game machine is an instruction exclusively for the graphic processing (T, U, for example), it is converted into an instruction adapted to the architecture of the GPU 74 by the graphic processing-use emulator, and the processes (t1+t2+t3, and etc.) corresponding thereto are carried out. Details of contents of the processes will be described later.

Figure 7:
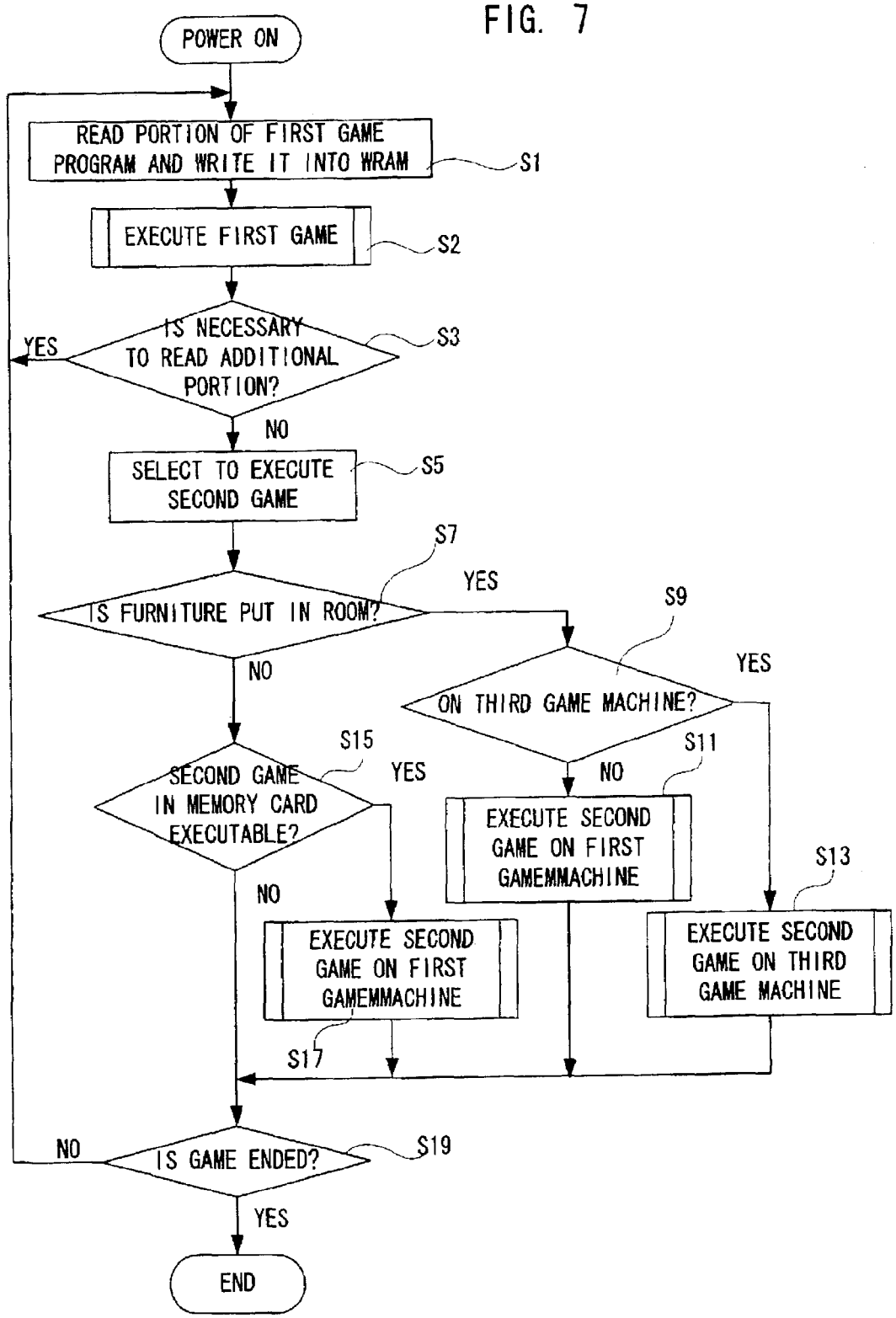
FIG. 7 is a flowchart showing the operation of a game being played in the FIG. 1 embodiment.

Next, an operation of the game system 10 of the FIG. 1 embodiment is described referring to a flowchart in FIG. 7. When a power source (not shown) of the first game machine, that is, the video game machine 12 is turned-on, in accordance with the OS program of the video game machine 12 and the reading-out program of the game information storage medium 16, a portion of the first game program 92 is read-out from the game information storage medium 16 in a step S1, and then written into the WRAM 72 (FIG. 2). Therefore, the first game program is executed in a step S2. Then, in a step S3, it is determined whether or not it is necessary to read-out an additional portion, and if "YES", the process returns to the step S1 so as to read-out the first game program 92.

However, it is noted that the invention is not limited to such a structure in which the first game program 92 is thus sequentially read-out instead, it may be possible to read-out the entire first game program 92 at one time so as to store the entire first game program 92 firstly within the WRAM 72.

Figure 8:
FIG. 8 is an illustrative view showing one example of a game screen of a game played in the FIG. 1 embodiment.
Figure 9:
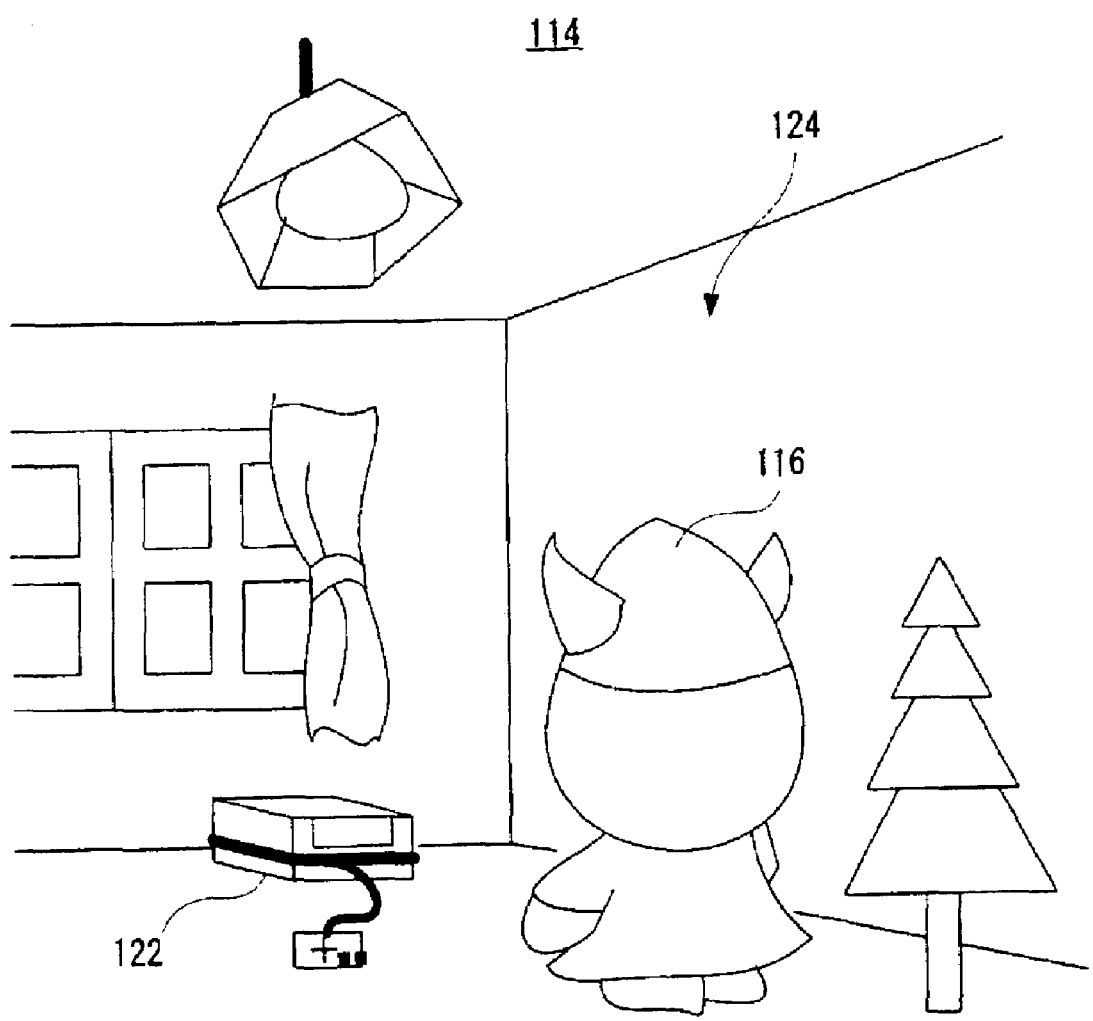
FIG. 9 is an illustrative view showing another example of a game screen of a game played in the FIG. 1 embodiment.

During a time that the first game program is being executed in the step S2, the game screen 114 shown in FIG. 8 and FIG. 9 is displayed on the television monitor 28 (FIG. 1 and FIG. 2), for example. The first game of this embodiment is "Animal Crossing" (trademark) as one example. This specific game is a game having a content that the player character 116 has a residence in a forest 118, and spends his life or does some activities therein. The game screen 114 in FIG. 8 shows a scene in which another character 120 met in the forest 118 gives a present 122 to the player character 116. In this embodiment, the present 122 is an NES that is the old-type game machine or the lower-grade game machine or the second game machine marketed by the applicant in the past. During the play of first game, the player character 116 puts the present, that is, the second game machine 122 in his own room 124 as furniture as shown in FIG. 9, rendering executable on the video game machine the second game program, which is essentially the game for the NES 122.

Described in more detail, the gift or premium providing condition producing program 96 shown in FIG. 4 is a program for displaying the present 122 (FIG. 8, FIG. 9) on the game screen 114, and the gift or premium providing condition detecting program 98 is a program for detecting that the player character 116 receives the present 122, and puts it in the room 124 (FIG. 9).

Then, if the player character 116 puts the present 122 in the room 124 as described above when the first game is being played, the second game is rendered playable on the video game machine 12, that is, the first game machine. In a step S5 in FIG. 7, the player character 126 is moved before the present 122 displayed as furniture within the room 124 shown in FIG. 9, and it is possible to select playing the second game by depressing the A button 42a (FIG. 1), for example. If the operation is done, the CPU 68 (FIG. 2) determines whether or not the second game program 108 previously stored in the game information storage medium 16 is in a state of being playable in a succeeding steps S7. That is, in the step S7, it is determined whether or not the furniture 122 is put within the room 124. However, it is noted that in a case that a plurality of pieces of furniture 122 are put within the room 124, it is determined which of these pieces of furniture (second game program) is selected in the step S7. As a consequence, the selected second game is to be played in a succeeding step S11 or S13 in this case.

If "YES" is determined in the step S7, the CPU 68 displays on the game screen 114 to the game player an inquiry message that asks "play on the third game machine?". Then, the game player answers the inquiry message.

"NO" being determined in the step S9 indicates that the game player answers "NO" to the previous inquiry message. In this case, the second game is executed on the first game machine, that is, on the video game machine 12 in the succeeding step S11.

"YES" being determined in the step S9 indicates that the game player answers "YES" to the previous inquiry message. In this case, the second game is executed on the third game machine, that is, on the hand-held game machine 50 (FIG. 1) in the succeeding step S13.

Figure 10:
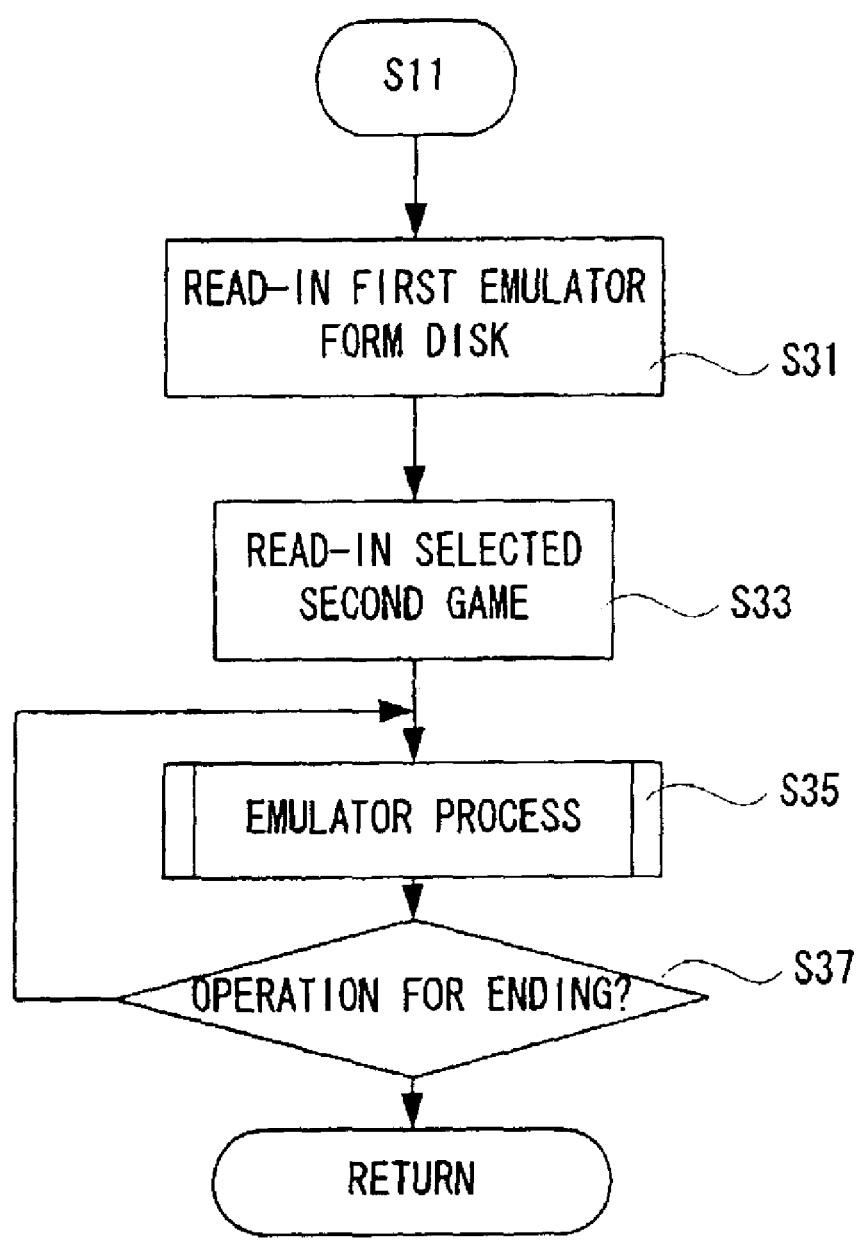
FIG. 10 is a flowchart showing a process or operation at a time when a game of an old-type game machine stored in the game information storage medium is played.

In the step S11, the second game is executed on the video game machine 12 in accordance with a flowchart shown in FIG. 10. That is, in a step S31, the CPU 68 reads-out the emulator program 110A from the disk 16, and then, stores the same within the WRAM 72. Then, in a succeeding step S33, the CPU 68 reads-out the second game program 108 from the disk 16, and similarly, stores it into the WRAM 72. Therefore, by this time, the first emulator program 110A and the second game program 108 have been stored in the WRAM 72 as shown in FIG. 4. Next, using the above-described emulator program 110A in a step S35, the second game is played by executing the emulator process.

Referring now to a subroutine in FIG. 11, details of the process of the program for the second game machine will be described with reference to the emulator program.

It is noted that in order for the processing operation to be easily understood, descriptions are made by associating the processes that are conventionally carried out by the CPU and the GPU of the second game machine (functional flow), and the processes by the emulator program 110A. Conventionally, when a game figure such as a game character, an object, or the like is displayed by the second game machine, it is assumed that the CPU of the second game machine executes the instructions A, B, and then, the GPU executes the process based on the instruction T, for example. Herein, the CPU of the second game machine assumes that the instruction A is an instruction for writing a value Y into an A register within the CPU, the instruction B is an instruction for adding a value Z into the A register of the CPU, and the instruction T is an instruction for allowing the GPU of the second game machine to carry out the process until displaying the figure based on the value of the A register.

Figure 12:
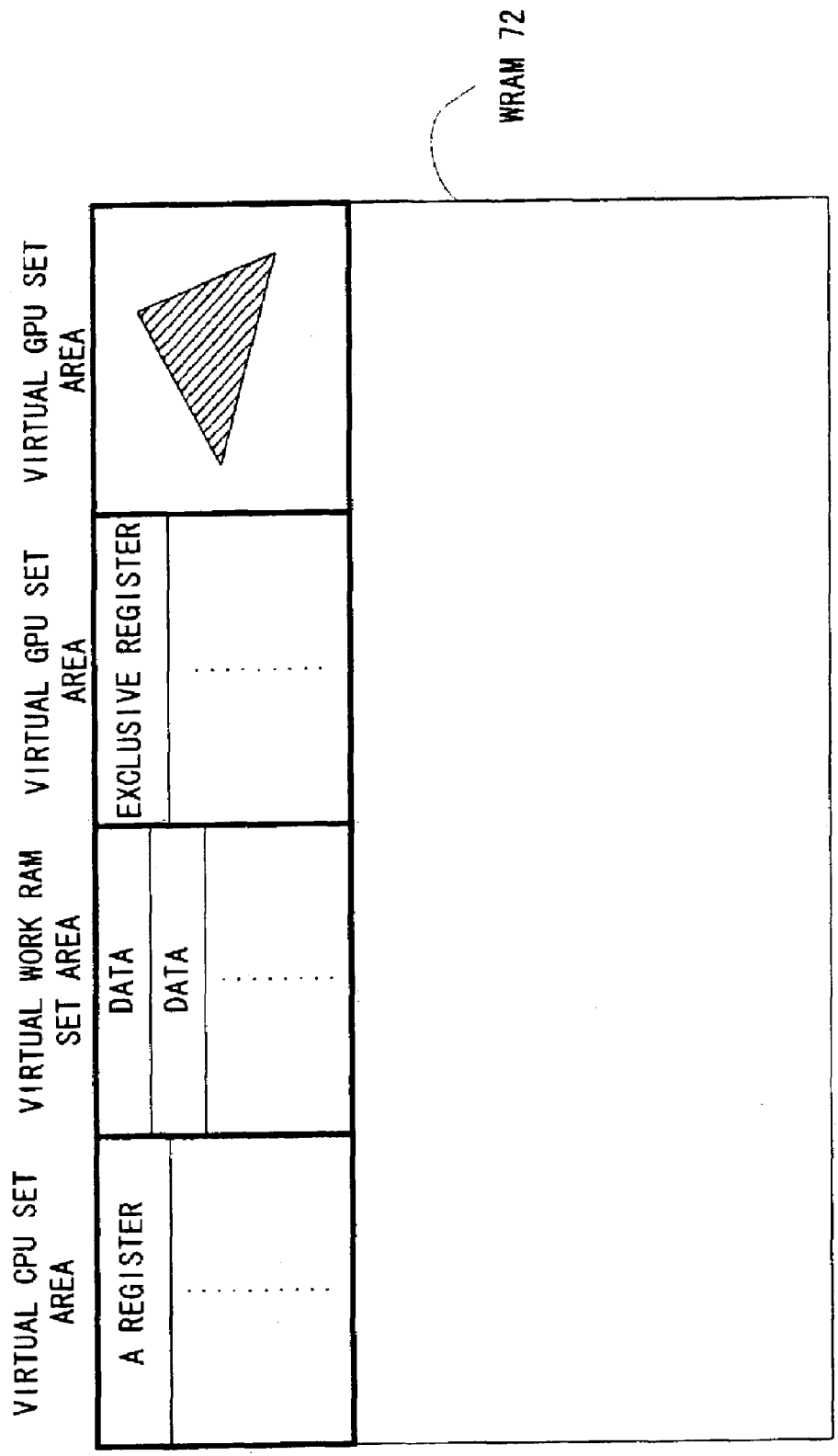
FIG. 12 is an illustrative view showing virtual storage areas assigned within the WRAM.

The emulator program 110A (as well as the emulator program 110B) assigns virtual setting areas for virtually reproducing the CPU and the GPU of the second game machine, and the WRAM, the VRAM and etc. included in the second game machine within the WRAM 72 of the video game machine 12 as shown in FIG. 12. In the virtual CPU setting areas, a virtual register, and etc. corresponding to each register incorporated in the CPU of the second game machine are assigned to predetermined addresses, for example. That is, a virtual A register corresponding to a certain register of the CPU of the second game machine (A register in the example) is set to a storing area of a certain address of the working RAM 25, and if a process is carried out toward the A register of the CPU of the second game machine, the CPU 68 emulates the functions of the CPU and the GPU of the second game machine are emulated by accessing the virtual A register of the certain address set in the working RAM 72. Similarly, the GPU, the WRAM, the VRAM, and etc. of the second game machine are emulated.

Firstly, in order to execute a program for displaying game figures, the emulator program reads-out the instruction A constituting the program, and carries out the process a corresponding to the instruction A in a step S91. More specifically, the emulator program (CPU emulator) writes the value Y into the virtual A register that corresponds to the A register of the CPU of the second game machine to which a certain address is assigned within the WRAM 72. It is noted that the process a is a process to be executed by instructions a1, a2, and a3 directly executable by the CPU 68.

In a succeeding step S93, the instruction B is read-out, and the process b corresponding to the instruction B is carried out. More specifically, the CPU 68 reads-out the value Y stored in the virtual A register so as to calculate a value (Y+Z) that a value Z is added to the value Y. Next, the value (Y+Z) is once again written into the virtual A register.

Furthermore, in steps S95, S97, and S99, the instruction T is read-out, and the process t1, t2, and t3 corresponding to the instruction T are sequentially carried out. The instruction T is an instruction for allowing the CPU of the second game machine to hand the value of the A register to the GPU of the second game machine, and the GPU to carry out a process for rendering. More specifically, the CPU 68 carries out following processes based on the GPU emulator program. That is, firstly, by executing the process t1, the value (Y+Z) is read-out from the virtual A register of the WRAM 72, thereby writing the value (Y+Z) into an exclusive register in the virtual GPU set area. Next, by executing the process t2, the operation process such as a geometry operation, and etc. is carried out, for example, based on the value written into the exclusive register (Y+Z), thereby generating graphics data in the virtual VRAM area corresponding to the VRAM of the second game machine. Furthermore, by executing the process t3, a game figure is generated within the VRAM (not shown) based on the graphics data within the virtual VRAM area. Then, the CPU 68 applies an instruction for rendering to the GPU 74 (FIG. 2). The GPU 74 generates an image graphics based on the game figure within the VRAM, and then outputs the image data from a video encoder 76 to the television monitor (step S101). As a result of the above-described processes on the video game machine 12, a game screen almost similar to the game screen displayed by the second game program is displayed on the monitor 28 (FIG. 1, FIG. 2) (step S103). It is noted that if there is an input from the controller 24, an instruction of the second game program corresponding thereto is sequentially read-out, and the process corresponding to the instruction is sequentially executed. Thus, the second game program is rendered executable by the video game machine 12 having a different architecture.

Thus, the second game program is executed on the video game machine 12 in the step S35, and then the step S35 is repeatedly executed until an operation for ending is detected in a step S37. If the operation for ending is detected in the step S37, the process returns from the step S11 to FIG. 7. Therefore, the first game is once again rendered executable.

Figure 13:
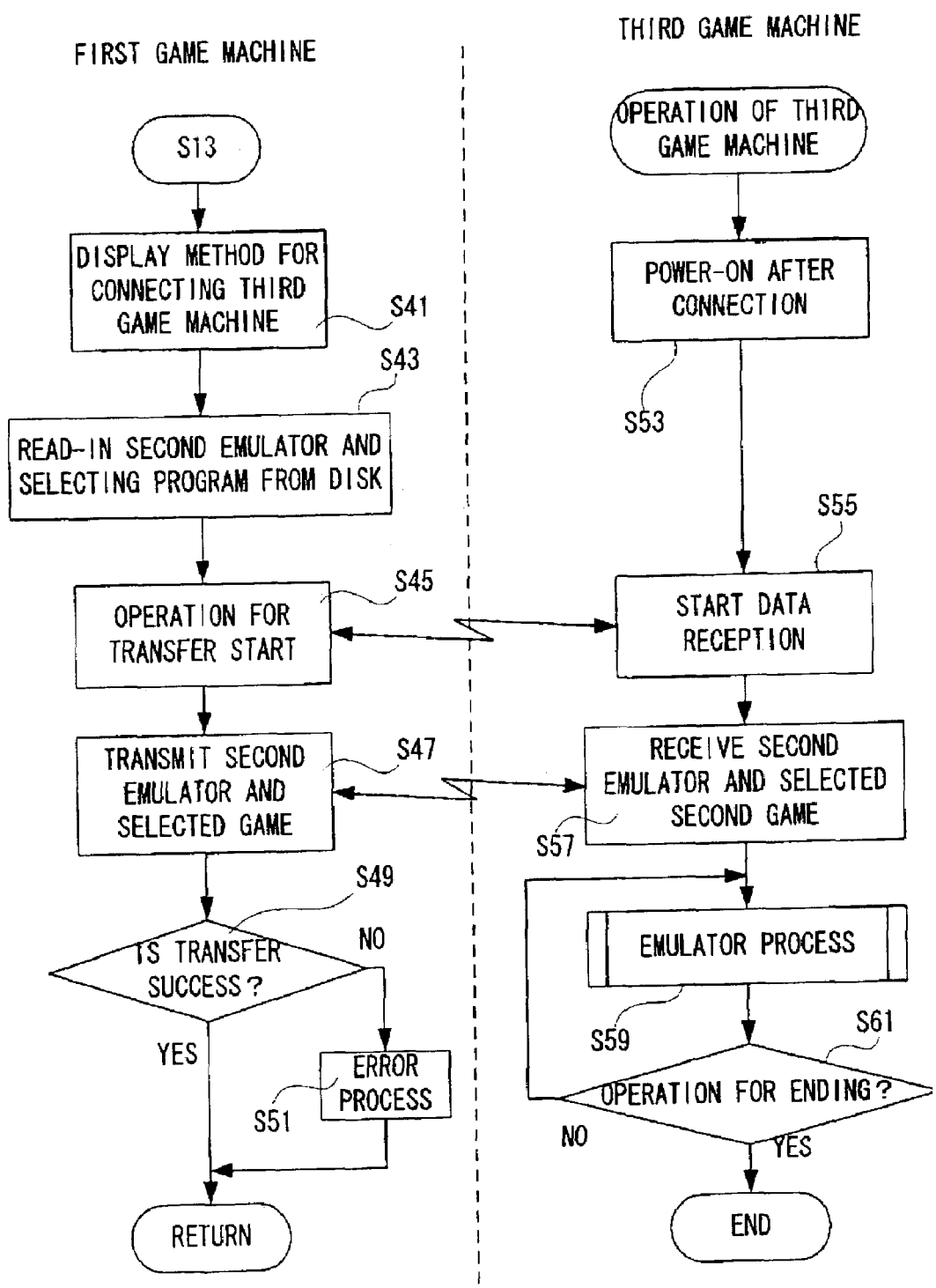
FIG. 13 is a flowchart showing a process or operation at a time when a game of an old-type game machine is played on a different game machine connected externally.

The step S13 in FIG. 7 is executed according to a flowchart shown in FIG. 13. On a left side of FIG. 13, shown is an operation of the video game machine 12, and an operation of the hand-held game machine 50 is shown on a right side. Firstly, by transferring the necessary programs and etc. from the video game machine 12 to the hand-held game machine 50, that is, the third game machine, the second game program is rendered executable on the third game machine.

In a step S41, which is a first step in FIG. 13, the CPU 68 of the video game machine 12 displays a method for connecting the hand-held game machine 50. In response thereto, the game player connects the hand-held game machine 50 to the video game machine 12 as shown in FIG. 1. Although the connection using the communication cable 52 for connecting the hand-held game machine 50 to the video game machine 12 is made in the embodiment in FIG. 1, other wired connections may be used, and a wireless connection using infrared light, weak radio wave, and etc. may also be used, for example.

Next, in a step S43, the CPU 68 reads-out the second emulator program 110B, and the game selection program 106 from the game information storage medium 16, and then temporarily stores into the WRAM 72. Thereafter, the second emulator program, and the selected second game program 108 are transferred to the hand-held game machine 50 in steps S45 and S47, and in the hand-held game machine 50, the CPU 78 receives the second emulator program 110B, and the second game program 108, and stores the programs into the WRAM 84 (FIG. 2).

If it is determined that the data transfer is successful in a step S49, the process directly returns to the first game in FIG. 7. However, if the transfer is unsuccessful, an error process is carried out in a step S51 before returning to the first game.

On the other hand, if the second emulator program 110B and the second game program 108 are successfully received by the hand-held game machine 50 as described before in steps S55 and S57, the program data are stored into the WRAM 84 (FIG. 2). It is noted that it is as a matter of course that the power source is turned-on in the hand-held game machine 50, after connecting to the video game machine 12 in a step S53 prior to the step S55.

Figure 11:
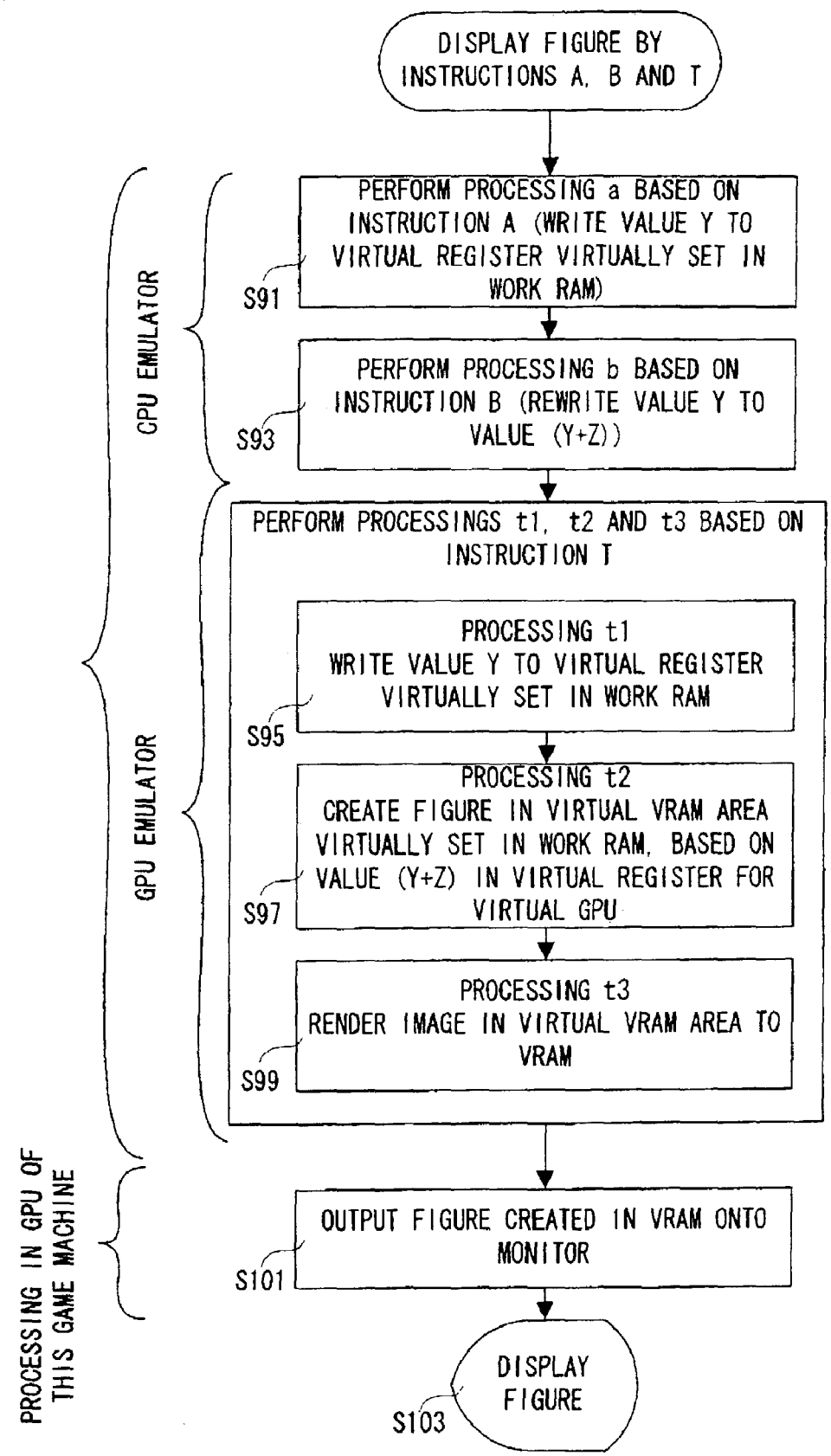
FIG. 11 is a flowchart showing one example of an emulator program.

Then, similar to the step S35 (FIG. 10) previously described referring to FIG. 11, the second game program 108 is executed using the emulator program 110B in a step S59.

Thus, the second game program is executed on the hand-held game machine 50 in the step S59. Then, the step S59 is repeatedly executed until an operation for ending is detected in a step S61. When the operation for ending is detected in the step S61, the process returns from the step S13 to FIG. 7. Therefore, the first game is once again rendered executable.

Returning to FIG. 7, if "NO" is determined in the step S7, the CPU 68 determines whether or not the second game program of the memory card 32 (FIG. 1, FIG. 2) is executable in a succeeding step S15. If "NO" is determined in the step S15, it is determined whether or not it is ended in a succeeding step S19, and if it is not ended, the process returns to the preceding step S1 so as to continue the first game. If "YES" is determined in the step S15, the second game program supplied from the memory card 32 is executed by the video game machine (first game machine) 12 in a succeeding step S17. The step S17 is executed according to FIG. 14.

Figure 14:
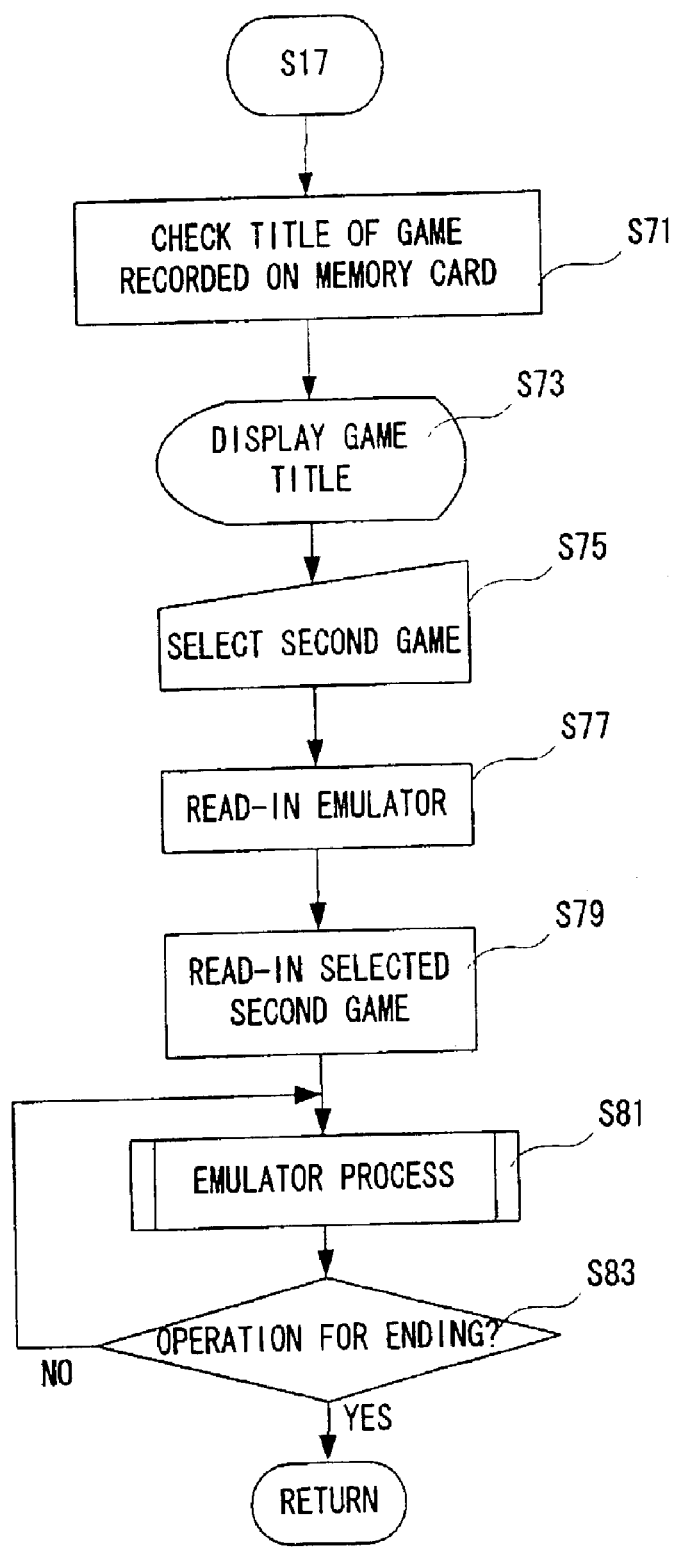
FIG. 14 is a flowchart showing a process or operation at a time when a game of an old-type game machine stored in an external storage medium (memory card) is played.

In a step S71, which is a first step in FIG. 14, the CPU 68 checks the game title of the second game being set within the memory card 32, and displays the title on the monitor 28 (FIG. 1) in a step S73. Accordingly, the game player operates the controller 24 in a step S75 so as to select the second game intended to play.

In a succeeding step S77, the CPU 68, in addition to reading from the game information storage medium 16 the first emulator program 100A, reads from the memory card 32 the second game program specified by the game player. Therefore, by this time, the emulator program and the second game program have been stored in the WRAM 72.

Thereafter, in a step S81, similar to the step S35 (FIG. 10), and the step S59 (FIG. 13), by executing the emulator process shown in FIG. 11, the second game is played. Thus, the second game program supplied from the memory card 32 is executed on the video game machine 12 in a step S81. Then, until the operation for ending is detected in a step S83, the step S81 is repeatedly executed. When the operation for ending is detected in the step S83, the process returns from a step S173. Therefore, the first game is once again rendered executable.

As described above, using the memory card 32 makes it possible to provide the second game program from other than the game information storage medium 16. Thus, as another method to supply the second game program from outside, an embodiment in FIG. 15 is usable.

Figure 15:
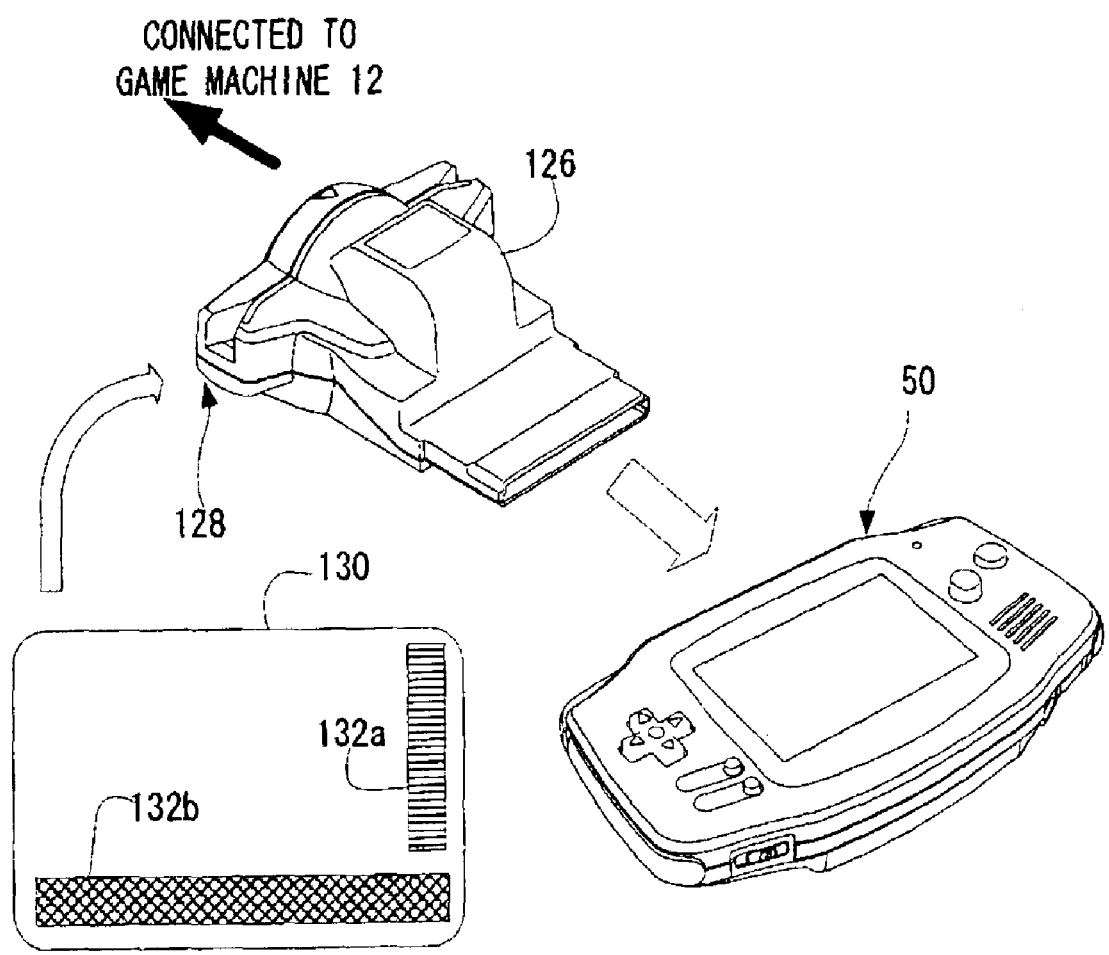
FIG. 15 is an illustrative view showing another example of the external storage medium.

In FIG. 15 embodiment, an e-card reader 126 is connected to a communication port of the hand-held game machine 15. The e-card reader 126 has a slit 128 through which the card passes, and in the vicinity of the slit 128, a card reader (not shown) is placed. Therefore, when the card 130 is moved inside the slit 128, card data is read from a magnetic area 132a and/or 132b of the card 130. Then, the card data thus read is temporarily stored into the WRAM 84 (FIG. 2), and transferred to the video game machine later.

However, if a communication function between the video game machine 12 is added to the e-card reader 126, the read card data can be directly transferred from the e-card reader 126 to the video game machine 12.

In FIG. 15 embodiment, by storing the second game program in the areas 132a, and 132b as the card data, it becomes possible to supply the second game program to the video game machine (first game machine) 12, which is a different method from the memory card 32.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game information storage medium for use by a first game machine employing a first architecture, said storage medium comprising:
    a first game program for execution by said first game machine;
    at least one second game program executable by a second game machine having a processing capability lower than said first game machine and employing a second architecture different from the first architecture;
    a first emulator program for rendering executable said second game program on the first game machine by subjecting said second game machine to an emulation on said first game machine;
    a reward or bonus providing condition generating program for generating, when said first game program is executed by said first game machine, a condition for providing a reward or bonus that permits said second game program to be executed on the first game machine by said first emulator program;
    a reward or bonus providing condition detecting program for detecting that said reward or bonus providing condition is established while said first game program is being executed by said first game machine; and
    a selection state detecting program for detecting, after said reward or bonus providing condition is detected, a state in which said second game program is selected for player execution on the first game machine, wherein
    said first game machine makes it possible to play, on the first game machine, a game dependent on the second game program through the execution of said second game program based on said first emulation program on said first game machine when a selection state is detected.

2. A game information storage medium according to claim 1, wherein
    said game information storage medium is an optical disk storage medium having a large storage capacity,
    said first game machine has a storage capacity smaller than that of said optical disk storage medium and larger than those of said first emulator program and the second game program, and is incorporated with a first memory which is capable of being written to and read from,
    said game information storage medium further stores a reading-out program for reading-out information stored therein,
    said reading-out program, prior to game play by said first game machine, reads-out from said game information storage medium a portion of said first game program so as to write into said first memory, and reads-out from said game information storage medium said first emulator program and at least a portion of said second game program so as to write into the first memory when the selection state is detected by said selection state detecting program, thereby enabling play of a game on the first game machine, dependent on the second game program, through executions of said second game program based on said first emulator program on said first game machine.

3. A game information storage medium according to claim 2, wherein
    said second game program includes a plurality of game programs for playing different available games,
    said reward or bonus providing condition generating program is a program for generating previously determined kinds of items on a game screen image displayed as a result of said first game machine executing said first game program, and generates a reward or bonus providing condition for making the available games of said second game program differ dependent on the kinds of items,
    said selection state detecting program specifies the game selected by the player out of the available games of said second game program in correspondence to the obtained kinds of items, wherein said reading-out program reads-out from said game information storage medium the second game program of the game selected and detected by said selection state detecting program and writes the same into said first memory.

4. A game information storage medium according to claim 1, wherein
said first game machine is connected to a third game machine employing a third architecture, having a processing capability higher than said second game machine including second writable/readable memory, and operable to exchange data with the third game machine, wherein
said game information storage medium further stores:
a second emulator program for rendering executable the second game program by subjecting said second game machine to an emulation on said third game machine,
a connection detecting program for detecting that said third game machine is connected to said first game machine,
a delivering program for reading-out said second emulator program and at least one said second game program and delivering the same to said third game machine, and
a game machine selecting program for allowing a player to select playing said second game program whether on said first game machine or on said third game machine after said reward or bonus providing condition is detected, wherein
said first game machine transfers said second emulator program and said second game program from said game information storage medium to said third game machine based on said delivering program when detecting by said game machine selecting program that said second game program is selected to be played on said third game machine, and then writes said second emulator program and said second game program into said second memory.

5. A game information storage medium according to claim 1, further comprising a switching program for switching to an execution of said first game program when said first game machine, which is executing said second game program, detects a previously determined switching condition.

6. A game information storage medium according to claim 1, wherein
said first game machine is connectable with said game information storage medium and a second information storage medium at the same time,
said game information storage medium further stores,
a second reward or bonus providing condition producing program for rendering selectable at least one game program for said second game machine, which is stored in said second information storage medium,
a second reward or bonus providing condition detecting program for detecting that a condition is satisfied, in which the reward or bonus stored in said second information storage medium becomes capable of being provided to a player based on said second reward or bonus providing condition producing program, and
a second selection state detecting program for detecting a condition selected by a player, in which said second game program stored in said second information storage medium is to be executed on the first game machine based on said second reward or bonus providing condition producing program, wherein
said first game machine reads-out from said second information storage medium the selected game program so as to start an execution based on said emulator program when said second selection state detecting program is executed and at least one game program stored in said second information storage medium is capable of being selected by the player.

7. A game information storage medium used by a first game machine employing a first architecture, comprising:
a first game machine connectable to a third game machine employing a third architecture having a processing capability higher than a second game machine, including a second writable/readable memory and operable to exchange data with the third game machine, wherein
said game information storage medium further stores,
a first game program executable by said first game machine,
at least one second game program executable by the second game machine employing a second architecture having a processing capability lower than both said first game machine and said third game machine, and different from the first game machine,
a second emulator program for allowing said second game program to be executed on said third game machine by subjecting said second game machine to an emulation on the third game machine,
a reward or bonus providing condition generating program for generating a condition in which a reward or bonus, rendering executable said second game program at least on the second game machine, is provided to a player when said first game program is being executed by said first game machine,
a reward or bonus providing condition detection program for detecting that said reward or bonus providing condition is satisfied when said first game program is being executed by said first game machine,
a selection state detecting program for detecting a condition that said second game program is selected to be executed on the third game machine by the player after said reward or bonus providing condition is detected,
a connection detecting program for detecting that said third game machine is connected to said first game machine, and
a delivering program for reading-out said second emulator program and at least one said second game program so as to deliver the both to said third game machine.

8. A game information storage medium according to claim 7, wherein
said game information storage medium further stores,
a first emulator program for rendering executable the second game program by subjecting said second game machine to an emulation on said first game machine, and
a game machine selecting program for allowing, after said reward or bonus providing condition is detected, the player to select playing said second game program whether on said first game machine or on said third game machine,
said first game machine writes into a first memory included in said first game machine said first emulator program and said second game program when it is detected that said second game program is selected to be played on said first game machine by said game machine selecting program, thereby making said second game program play on said first game machine based on said first emulator program.

9. A game information storage medium according to claim 7, wherein said game information storage medium is an optical disk storage medium having a large storage capacity, said first game machine has a storage capacity smaller than that of said optical disk storage medium and larger than those of said second emulator program and the second game program, and includes a first writable/readable memory, said game information storage medium further stores a reading-out program for reading-out information stored therein, said reading-out program, prior to game play by said first game machine, reads-out a portion of said first game program from said game information storage medium so as to write into said first memory, and when a selection detection is performed by said selection detection program, reads-out said second emulator program and at least a portion of said second game program from the game information storage medium so as to write into the second memory, and thereafter, said second game program is executed by referring to said second emulator program on said third game machine, rendering playable the game dependent on the second game program on the third game machine.

10. A game system, provided with a first game machine employing a certain architecture that executes a program, stored in a game information storage medium, employing an architecture different from a first architecture, and providing a game for a second game machine having a processing capability lower than the first game machine, capable of being emulated on at least a third game machine employing a third architecture having a processing capability higher than the second game machine, comprising:

a data transmission/reception arrangement that is connected to said third game machine so as to exchange data, connectable to said first game machine, a second memory for storing data transmitted and received between said first game machine via the data transmission/reception arrangement, included in said third game machine, wherein said game information storage medium further stores, a first game program executed by said first game machine, at least one second game program executed by said second game machine, a connection detecting program for detecting that said third game machine is connected to said first game machine, a second emulator program for rendering executable said second game program on the third game machine by subjecting said second game machine to an emulation on said third game machine, a reward or bonus providing condition generating program for generating a condition wherein a reward or bonus renders executable said second game program at least on the second game machine when said first game program is being executed by said first game machine, a reward or bonus providing condition detecting program for detecting that said reward or bonus providing condition is satisfied when said first game program is being executed by said first game machine, a selection state detecting program for detecting a state that said second game program is selected to be executed on the third game machine by the player after said reward or bonus providing condition is detected, and a delivering program that reads-out said second emulator program and at least one said second game program so as to deliver to said third game machine, wherein said first game machine, when said selection state is detected, and it is detected that said third game machine and said first game machine are connected to each other, reads-out from the game information storage medium said second emulator program and at least one said second game program based on said delivering program, and then writes the same into said second memory via said data transmission/reception arrangement, thereby allowing said second game program to be executed on said third game machine based on said second emulator program, rendering playable game play on the third game machine.

11. A game system according to claim 10, wherein said game information storage medium further stores, a first emulator program for rendering executable the second game program by subjecting said second game machine to an emulation on said first game machine, and a game machine selecting program for allowing a player to select said second game program whether on said first game machine or on said third game machine after said reward or bonus providing condition is detected, wherein said first game machine, when it is detected by said game machine selecting program that said second game program is selected to be played on said first game machine, writes said first emulator program and said second game program into the first memory included in said first game machine, thereby allowing said second game program to be played on said first game machine based on said first emulator program.

12. A game system according to claim 10, wherein said game information storage medium is an optical disk storage medium having a large storage capacity, said first game machine includes a first writable/readable memory which has a storage capacity smaller than that of the optical disk storage medium and larger than those of said second emulator program and the second game program, said game information storage medium further stores a reading-out program for reading-out information stored therein, said reading-out program, prior to a game play by said first game machine, reads-out from said game information storage medium a portion of said first game program so as to write into said first memory, and reads-out, when a selection detection is performed by said selection detection program, from said game information storage medium said second emulator program and at least a portion of said second game program so as to write into the second memory, and thereafter, said second game program is executed by referring to said second emulator program on said third game machine, rendering playable a game dependent on the second game program on the third game machine.

13. A game system comprising a first game machine employing a first architecture that executes a program stored in a first information storage medium storing a game program, providing a game for a second game machine employing a second architecture different from said first architecture and having a processing capability lower than the first game machine, wherein:

said first game machine is connectable to a second information storage medium and the first information storage medium at the same time, said first information storage medium stores,
- a first game program executed by said first game machine,
- at least one second game program to be executed by said second game machine,
- a first emulator program for rendering executable said second game program on said first game machine by subjecting said second game machine to an emulation on said first game machine,
- a reward or bonus providing condition generating program for generating a condition for providing a reward or bonus that said second game program is permitted to be executed on the first game machine when said first game program is being executed by said first game machine, a reward or bonus providing condition detecting program for detecting that said reward or bonus providing condition is satisfied when said first game program is being executed by said first game machine, a selection state detecting program for detecting a state in which said second game program is selected to be executed on the first game machine by the player after said reward or bonus providing condition is detected, wherein said second information storage medium further stores, a second reward or bonus providing condition generating program rendering selectable at least one game program for said second game machine stored in said second information storage medium, a second reward or bonus providing condition detecting program for detecting a condition is satisfied, in which the reward or bonus stored in said second information storage medium becomes active, based on said second reward or bonus providing condition detecting program, and a second selection state detecting program for detecting a state that said second game program stored in said second information storage medium is selected to be executed on the first game machine by the player based on said second reward or bonus providing condition detecting program, wherein said first game machine reads-out the selected game program from said second information storage medium so as to start an execution based on said emulator program when said second selection state detecting program is executed, and at least one game program stored in said second information storage medium is selectable by the player.

* * * * *